United States Patent [19]

Sugiura et al.

[11] Patent Number: 5,755,963
[45] Date of Patent: May 26, 1998

[54] FILTER ELEMENT AND FABRICATION METHOD FOR THE SAME

[75] Inventors: Masahito Sugiura, Takahama; Toshihiko Murase, Anjo; Yoshihisa Sanami, Obu; Toshihiro Takahara, Kariya; Atushi Kosaka, Okazaki; Takeharu Maekawa, Chita-gun; Sojiro Tsuchiya, Nagoya, all of Japan

[73] Assignee: Nippondenso Co., Ltd., Kariya, Japan

[21] Appl. No.: 687,951

[22] Filed: Jul. 26, 1996

[30] Foreign Application Priority Data

Jul. 28, 1995 [JP] Japan .................................. 7-193818
Jun. 3, 1996 [JP] Japan .................................. 8-139814

[51] Int. Cl.$^6$ .................................................. B01D 27/06
[52] U.S. Cl. .................................... 210/493.1; 210/493.5; 210/497.01; 210/506; 210/509; 210/510.1; 162/383; 162/387
[58] Field of Search ...................... 162/218, 231, 162/387, 383; 210/493.1, 493.5, 497.01, 506, 509, 510.1

[56] References Cited

U.S. PATENT DOCUMENTS

| | | | |
|---|---|---|---|
| 3,028,911 | 4/1962 | Lear | 162/383 |
| 3,622,446 | 11/1971 | Burnham | 162/218 |
| 4,111,815 | 9/1978 | Walker et al. | 210/508 |
| 4,732,678 | 3/1988 | Humbert, Jr. | 210/497.01 |
| 4,889,630 | 12/1989 | Reinhardt et al. | 210/508 |
| 4,929,308 | 5/1990 | Gerault et al. | 162/218 |
| 5,084,178 | 1/1992 | Miller et al. | 210/493.5 |

*Primary Examiner*—W. L. Walker
*Attorney, Agent, or Firm*—Nixon & Vanderhye P.C.

[57] ABSTRACT

A filter element for use in an oil filter is composed of main fibers of at least 5 μm diameter and micro fibers of less than 5 μm diameter. The micro fibers are filled in a density of 0.005 to 0.02 g/cm$^3$. A slurry including the fibers is drawn into a suction unit through suction openings to form a molded body. The filter element is given a density gradient such that the micro fibers are denser in the inner periphery than in the outer periphery. Following the drawing step, the molded body together with the inner mold is removed for subsequent dehydration and heating. During those processes the inner mold is kept located within the molded body.

14 Claims, 22 Drawing Sheets

FILTER ELEMENT AND FABRICATION METHOD FOR THE SAME

BACKGROUND OF THE INVENTION

1. Field of the Invention

The present invention relates to a filter element for filtering a fluid to remove solid particles and a method for fabricating the same.

2. Description of Related Art

It is well known that in order to improve filtering efficiency, a conventional paper filter, as a filter element for use in an oil filter or air filter, is made from micro fibers having a diameter of less than 5 μm (with a filling density of at least 0.04 g/cm³). In this respect reference may be had to Japanese laid-open patent publication Nos. Sho 57-132522, Sho 58-205520, and Hei 3-12208. A paper machine is used to transform a slurry, or a suspension of fine or micro fibers and natural or chemical fibers in solution, into a sheet of paper. To increase the surface area, the sheet of paper is bent into a predetermined shape.

The paper filter thus made provides high filtering efficiency, but suffers from loss of pressure. This is because such a paper filter normally has a thickness of less than 1 mm and has a high content of micro fibers per volume. The sheet of paper must thus be bent (sometimes, into a complicated shape) to increase its surface area and reduce loss of pressure. This, however, results in an increase in the fabrication cost.

It is also known by Japanese laid-open patent publication No. Hei 2-160043 to use a porous plate to draw fibers and form a molded body for filter element. The molded body is thereafter removed from the porous plate. The molded body has a high content of water and is thus in a sherbet or cotton-like state. This makes it difficult to remove the porous plate. Also, due to the high porosity, the shape of the molded body is difficult to maintain after the porous plate has been removed. To this end, the molded body could be dried while it is mounted to the porous plate. However, this approach makes it more difficult to remove the porous plate since the molded body and fibers adheres to the porous plate. Usually, the molded body is not shaped as accurately as it should be. It is thus difficult to accurately position and hold the molded body in steps subsequent to the drawing and molding process. Since it is difficult to remove the porous plate or maintain the shape of the molded body, this approach is not suitable for mass production of the filter element.

It is further known by Japanese patent publication No. Sho 53-43709 to provide an inner cylinder with recesses. This arrangement reduces the rigidity of a filter element to a substantial extent, particularly where it is used under severe conditions, for example, when it is incorporated into an oil filter. It is thus vulnerable to pressure differential. Unlike a simple cylinder, it also requires a special seal to separate clean and dirty sides from one another. This results in an increase in the fabrication cost.

SUMMARY OF THE INVENTION

In view of the foregoing, it is a principal object of the present invention to provide an improved filter element and its fabricating method.

It is another object of the oresent invention to provide a filter element and a fabricating method by which high filtering efficiency and low pressure loss are attained at low cost.

It is a further object of the present invention to provide a filter element and a fabricating method which enables high productivity.

According to a first aspect of the present invention, a filter element has a cylindrical portion and is molded of main fibers and micro fibers. The main fibers have a diameter of at least 5 μm, and the micro fibers have a diameter of less than 5 μm. This combination provides better filter efficiency.

Preferably, to reduce the loss of pressure and increase the filtering efficiency, the micro fibers are arranged to have a density of 0.005 to 0.02 g/cm³.

Preferably the filter element is given a density gradient of fibers such that the filter element is more porous at the inlet side and denser at the outlet side with respect to fluid flow direction.

Preferably, a plurality of axial grooves are formed in at least one of the outer and inner peripheral surfaces of a cylindrical body used in filter element fabrication. This leads to an increase in the surface area of the filter element and brings about a decrease in loss of pressure.

In fabrication, the filter element is molded by drawing a slurry having a mixture of main fibers and micro fibers into a suction unit in a slurry tank. The suction unit is configured so as to readily increase the surface area of the filter element. In this instance, the filter element may be molded by feeding a second slurry primarily including the micro fibers into the slurry tank in which a first slurry primarily including the main fibers is contained, and then, drawing a mixture of the first slurry and the second slurry into the suction unit. This makes it possible to readily change the filling density of the micro fibers in the thickness (radial) direction of the cylindrical portion.

Preferably, the flow rate of a pump for drawing is changed while the slurry is being drawn into the suction unit, the number of suction openings vary in the circumferential direction of the suction unit, or the positional relationship between the suction unit and feed nozzles for feeding the second slurry is changed during the feeding and drawing step.

According to a second aspect of the present invention, a molded body for filter element is made by drawing slurry of fibers through an inner mold of a suction unit kept integrally with the inner mold. The filter element can be strengthened by the inner mold. It is not necessary to remove the inner mold from the molded body after the drawing step is completed. The filter element can be molded into a complicated shape in accordance with the shape of the inner mold.

Preferably, the molded body extends over the ends of the inner mold. If it is necessary to seal the ends of the inner mold, such a seal is integrally formed in the ends of the inner mold.

In fabrication, the inner mold is used as a reference to hold and position the molded body in steps subsequent to the drawing. This facilitates positioning of the molded body in the following fabrication process as the inner mold serves as a reference.

Preferably, the space defined in the ends of the inner mold by the fins is closed by the fibers and a seal is integrally formed at the inner periphery of the molded body.

Preferably, a circulating flow is created in a slurry tank. Drawing is effected in the circulating flow, whereby the slurry in which the fibers are uniformly scattered is positively drawn.

Preferably, drawing is effected while the inner mold is being rotated so that the fibers have a substantially uniform density in the circumferential direction.

Preferably, the suction openings are defined over a suction cylinder inside the inner mold. The suction cylinder is lower in porosity than the inner mold to insure the constant flow of the slurry through the inner mold for a uniform fiber density.

BRIEF DESCRIPTION OF THE DRAWINGS

Other objects, features and advantages of the present invention will become more apparent from the followings description when read with reference to the accompanying drawings, in which.

DETAILED DESCRIPTION OF PREFERRED EXEMPLARY EMBODIMENTS

A filter element according to embodiments of the present invention will now be described with reference to the accompanying drawings.

(First Embodiment)

Figure 1:
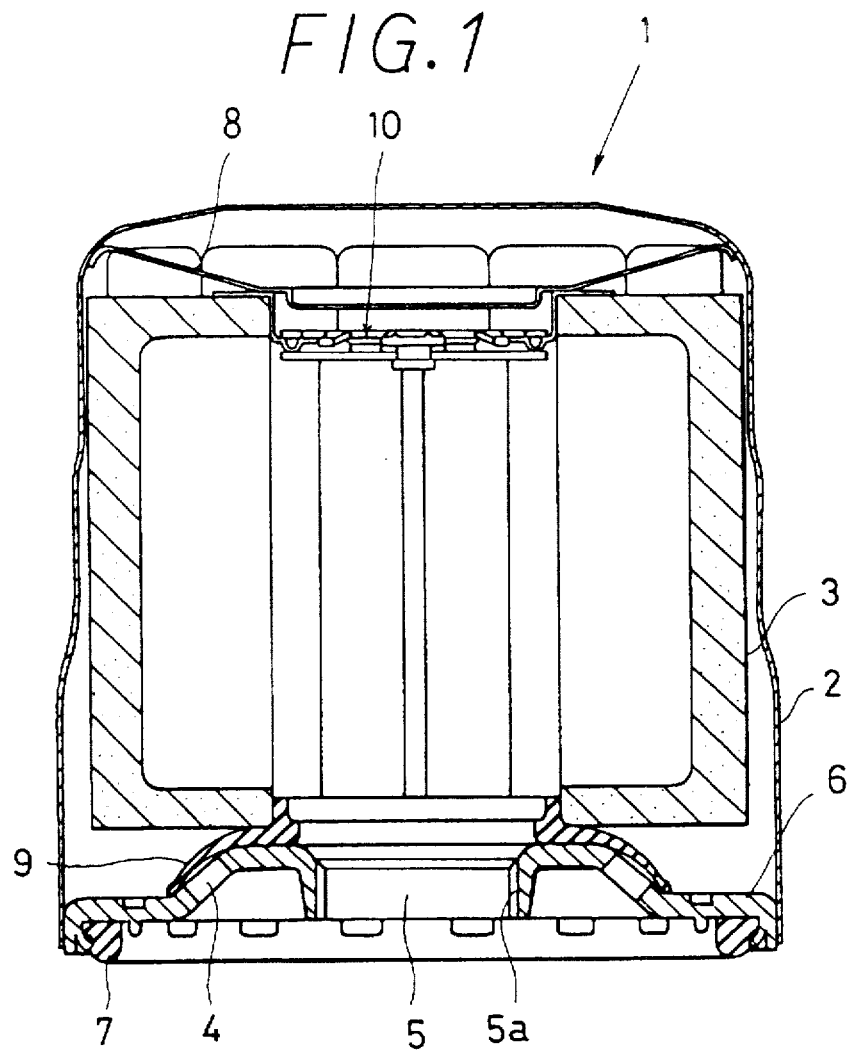
FIG. 1 is a sectional view of an oil filter in its entirety according to a first embodiment of the present invention.

As shown in FIG. 1, an oil filter 1 includes a cylindrical case 2 (made, for example, of iron) within which a filter element 3 (or filter element) is contained. The case 2 has an open end at the bottom. A plate 6 is attached to the open end of the case 2 and includes a plurality of oil inlets 4 and an oil outlet 5. A gasket 7 is held by the plate 6 and made of rubber. The oil filter 1 is mounted to the mounting base of an engine (not shown) through the gasket 7.

The filter element 3 has one end (top end) urged downward by a leaf spring 8 and the other end held by the plate 6 through a check valve 9 made of rubber. The leaf spring 9 is attached to one end (top end) of the case 2. A relief valve 10 is mounted centrally on the top end of the filter element 3. The relief valve 10 is opened to allow a sufficient amount of oil to be fed to the engine when pressure within the case 2 (outside of the filter element 3) increases due to clogging of the filter element 3.

The oil outlet 5 is centrally formed in the plate 6. Oil flows through the oil outlet 5 after it has been filtered out in the filter element 3. The oil inlets 4 are arranged around the oil outlet 5 to receive oil from the engine. A female thread 5a is formed in the inner peripheral surface of the oil outlet 5 and threaded with the male thread (not shown) of the mounting base of the engine.

The check valve 9 is attached to the inner surface of the plate 6 and adapted to close the oil inlets 4 so as to prevent reverse flow of oil through the oil inlets 4. The check valve 9 is adapted to open the oil inlets 4 only when the oil flows from the engine into the oil filter 1.

Figure 2:
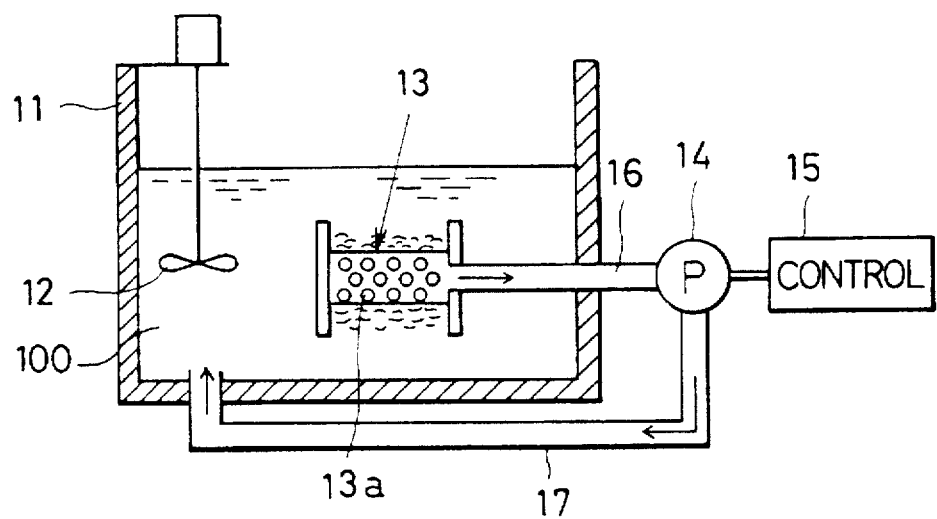
FIG. 2 is a schematic view of a suction type mold system used in the first embodiment.

The filter element 3 of this embodiment is formed into a cylindrical shape and fabricated by a suction type mold system (which will be described later) as shown in FIG. 2. The filter element 3 is composed of fibers having a diameter of at least 5 μm (hereinafter, referred to as main fibers) and micro fibers having a diameter of less than 5 μm. Advantageously the main fibers are made of natural pulp, but may be made of chemical fibers such as polyester, acryl, rayon or the like. The micro fibers are made of organic fibers such as polyester, polyethylene, acryl, rayon or the like. The micro fibers have a filling density of 0.005 to 0.02 g/cm$^3$.

The suction type mold system generally includes a water tank 11 within which a mixture slurry 100 of main fibers and micro fibers is contained, a mixer 12 for mixing the slurry within the water tank 11, a suction unit or jig 13 immersed in the slurry within the water tank 11, a suction pump 14 for drawing the slurry from the suction unit 13 through a plurality of suction openings 13a, and a pump controller 15 (for example, voltage controller for adjusting voltage applied to the motor of the suction pump 14) for changing the pump flow rate of the suction pump 14. A suction pipe 16 and a discharge pipe 17 are connected to the suction pump 14. The upstream end of the suction pipe 16 is connected to the suction unit 13. The downstream end of the discharge pipe 17 is open to the water tank 11. With this arrangement, the slurry is drawn from the water tank 11 by the vacuum pump 14, flows through the suction pipe 16 and then, the discharge pipe 17, and is returned to the water tank 11.

Figure 3:
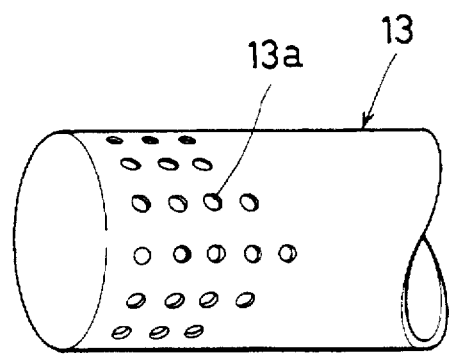
FIG. 3 is a perspective view of a suction unit used in the first embodiment.
Figure 4:
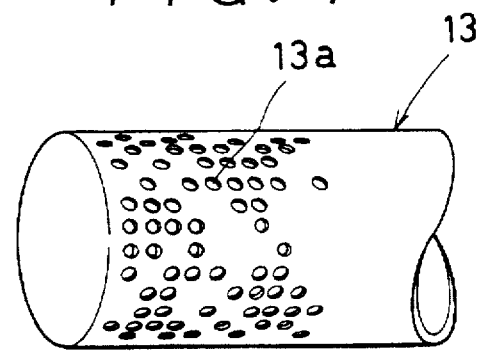
FIG. 4 is a perspective view of another suction unit used in the first embodiment.
Figure 5:
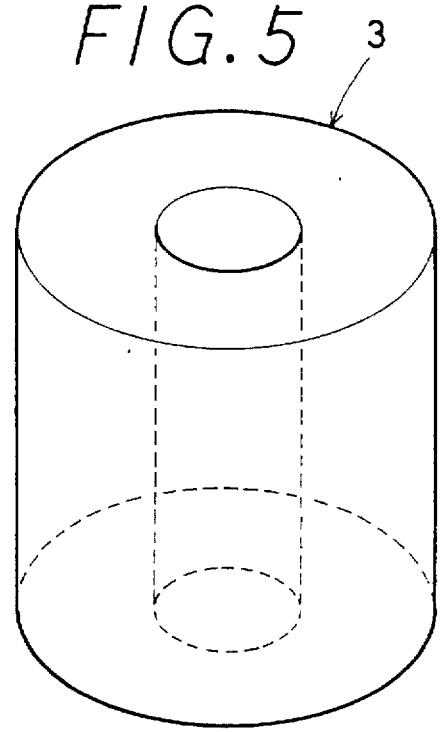
FIG. 5 is a perspective view of a filter element.

The suction unit 13 of the suction type mold system may take any form to change the configuration of the filter element 3. For example, the cylindrical suction unit 13 (FIGS. 3 and 4) is formed on its outer periphery with a multiplicity of suction openings 13a. This jig 13 is used to make a cylindrical filter element 3 shown in FIG. 5. The suction unit 13 may take another form such as shown in FIGS. 6 and 7.

Figure 6:
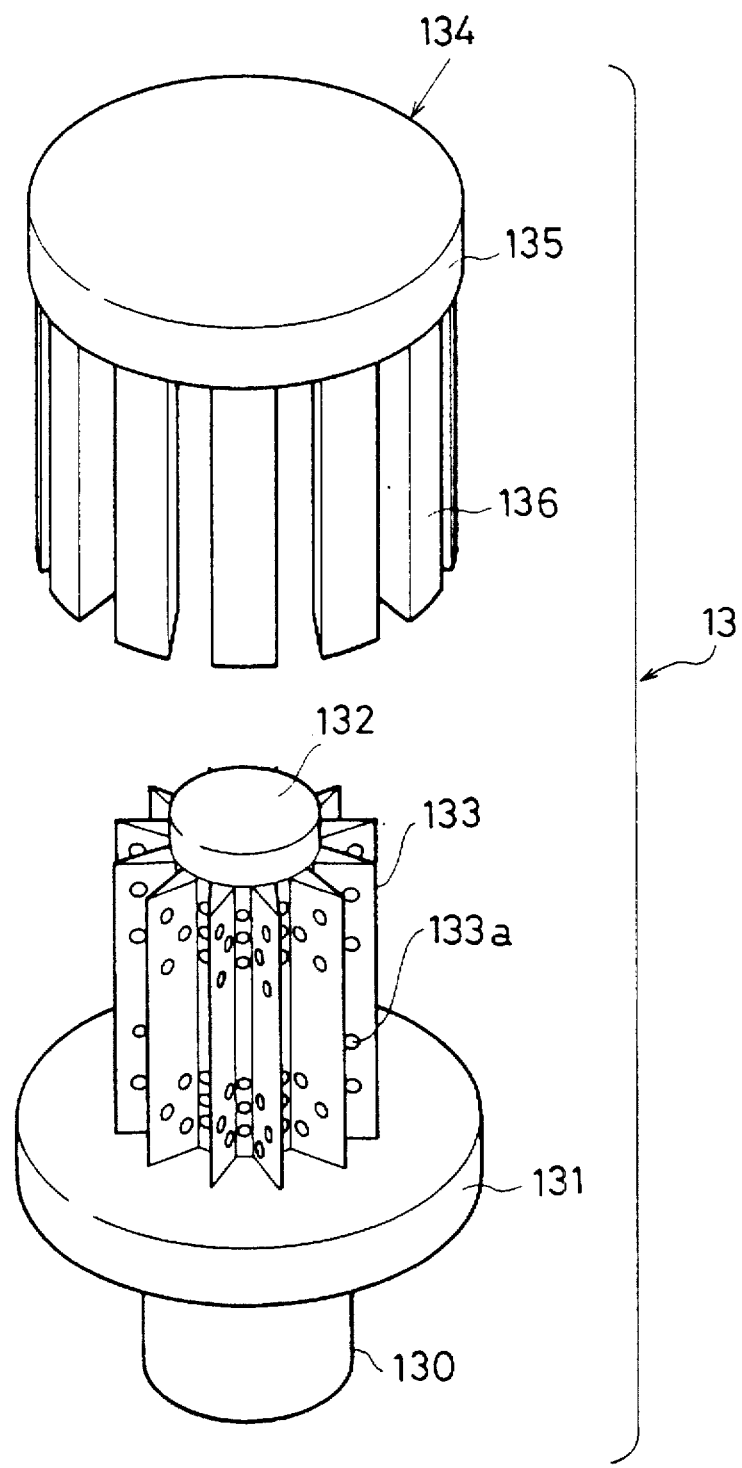
FIG. 6 is a perspective view of the suction unit used in the first embodiment.
Figure 7:
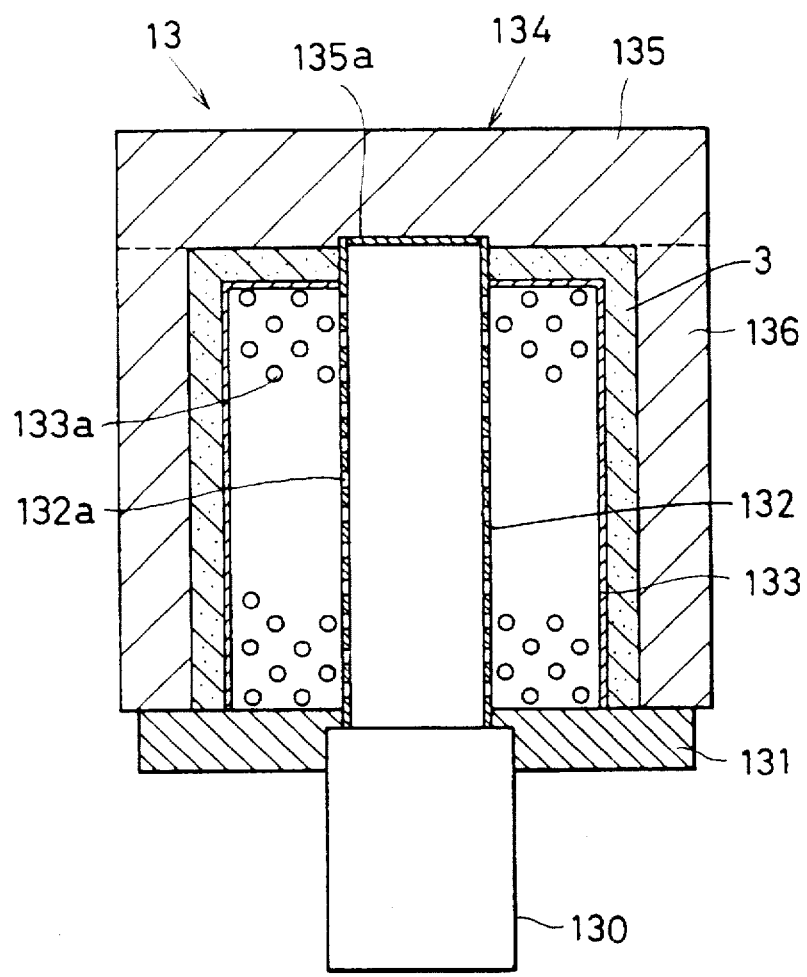
FIG. 7 is a sectional view of the suction unit used in the first embodiment.

In FIGS. 6 and 7, the suction unit 13 includes a circular base 131 with a pipe joint 130, a suction cylinder 132 secured centrally to the base 131 and connected to the pipe joint 130, an inner mold 133 extending radially outwardly around the suction cylinder 132 and having a star-shaped section, and an outer mold 134 shaped to encase the inner mold 133 therein. The pipe joint 130 has an open end (bottom in FIG. 7) which is connectable to the suction pipe 16 and provides a fluid communication between the suction pipe 16 and the suction cylinder 132. The suction cylinder 132 has a closed top (FIG. 7) and is formed on its periphery with a multiplicity of suction openings 132a. As shown in FIG. 7, the inner mold 133 is hollow and is formed on its surface with a multiplicity of suction openings 133a. The outer mold 134 includes a circular base 135 arranged opposite to the base 131 with respect to the suction cylinder 132. A plurality of pawls 136 extend from the outer edge of the base 135 and are arranged in a circumferentially spaced relationship. As shown in FIG. 7, a recess 135a is formed centrally in the inner surface of the base 135. The top end of the suction cylinder 132 is fit into the recess 135a. Each of the pawls 136 has a bottom end in contact with the surface of the base 131 when the outer mold 134 and the inner mold 133 are assembled together.

The suction type mold system (FIG. 2) using the suction unit 13 (FIG. 6) operates as follows.

Figure 8:
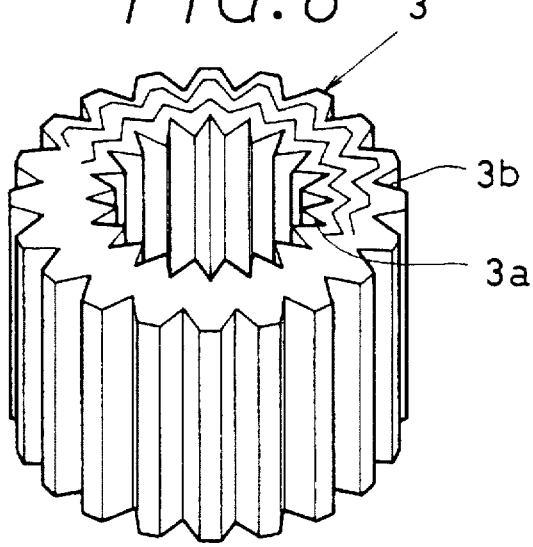
FIG. 8 is a perspective view of a filter element fabricated in the first embodiment.

When the suction pump 14 is driven, the slurry within the water tank 11 flows between each adjacent pawls 136 of the outer mold 134 and is drawn into the interior of the inner mold 133 through the suction openings 133a. The slurry is thereafter drawn into the interior of the suction cylinder 132 through the suction openings 132a. The slurry flows into the suction pipe 16 through the pipe joint 130 and is drawn into the suction pump 14. The slurry is then pumped out from the suction pump 14 and is returned to the water tank 11 through the suction pipe 17. During this flow cycle, some part of fibers (main fibers, micro fibers, and binder fibers) contained within the slurry is attached to the surface of the inner mold 133 when it flows through the suction openings 13a of the inner mold 133. The fibers are gradually accumulated to thereby form a layer. As shown in FIG. 8, the layer extends along the inner and outer peripheral surfaces of the inner mold 133. The layer includes a plurality of grooves 3a, 3b and has a star-shaped section.

Figure 9:
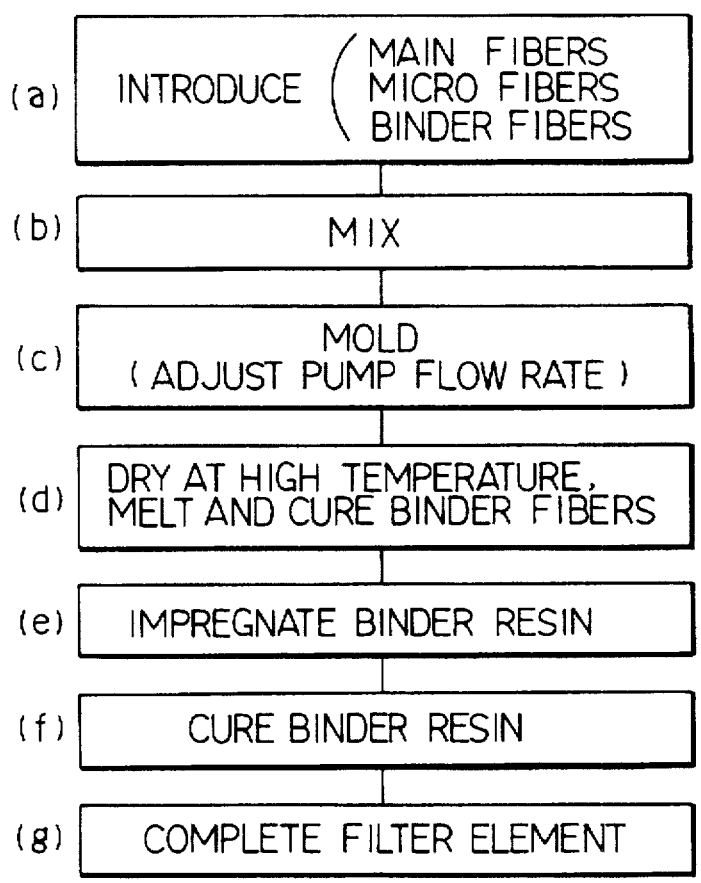
FIG. 9 is a flow chart showing a process by which the filter element is fabricated in the first embodiment.

The sequence of fabrication steps is performed as shown in FIG. 9.

Firstly, the main fibers and the micro fibers, after being finely severed by a mixer (not shown), are evenly mixed with binder fibers (heat sealable fibers). These fibers are then introduced into the water tank 11 at a step (a). The fibers are thereafter agitated by the mixer 12 at a step (b) to provide a uniform density of the fibers in the slurry.

Figure 10:
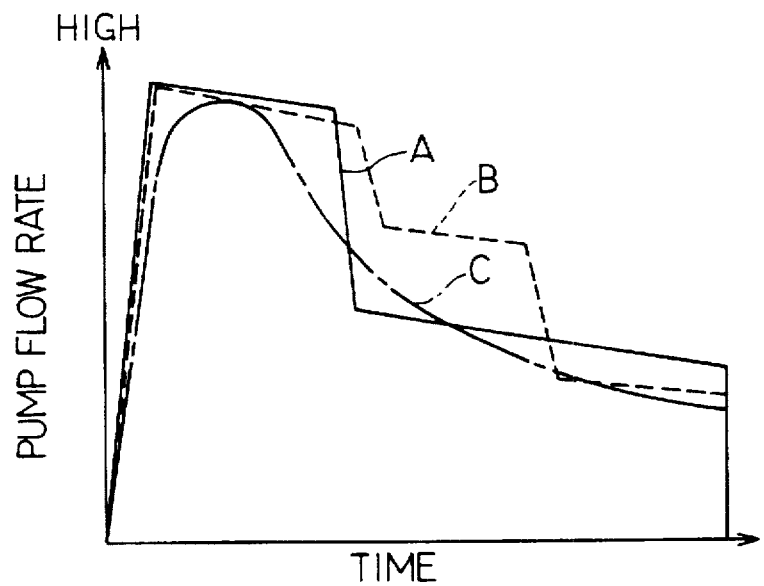
FIG. 10 is a graph showing the manner in which the pump flow rate is controlled in the first embodiment.

Following this step, the suction pump 14 is operated to draw the slurry within the water tank 11 into the suction unit 13 through the suction openings 13a at a step (c). At this time, the pump controller 15 adjusts the speed of rotation of the suction pump 14 to change the pump flow rate. As shown in FIG. 10, this brings about a change in the filling density of the fibers of the filter element 3 formed in the suction unit 13. Advantageously, the filter element 3 for use in the oil filter 1 is given a density gradient such that the fibers are "dense" in the inner periphery and become less "dense" or more "porous" toward the outer periphery of the filter element 3. This is because oil flows from the outer periphery toward the inner periphery of the filter element 3.

Figure 11:
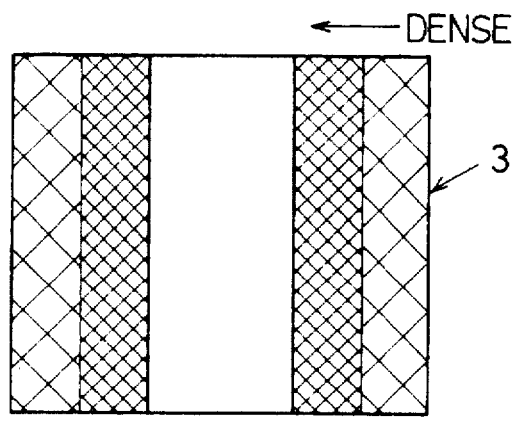
FIG. 11 is a sectional view of a filter element wherein the density of micro fibers is changed in a stepwise manner for a two-layer construction.
Figure 12:
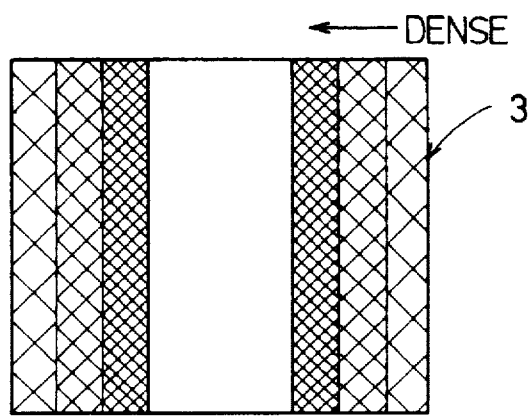
FIG. 12 is a sectional view of a filter element wherein the density of micro fibers is changed in a stepwise manner for a three-layer construction.
Figure 13:
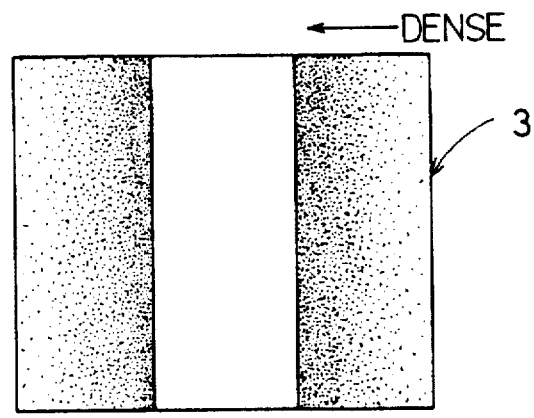
FIG. 13 is a sectional view of a filter element wherein the density of micro fibers is changed in a continuous manner.

As shown by the solid line A in FIG. 10, the pump flow rate may, for example, be changed in two steps, "high" and "low", during molding. This allows the filter element 3 to have a density gradient such that the fibers are "dense" in the inner periphery of the filter element 3 and "porous" in the outer periphery of the filter element 3 as shown in FIG. 11. Alternatively, the pump flow rate may be changed in three steps, "high", "medium" and "low" as shown by the broken line B in FIG. 10. This allows the filter element 3 to have a density gradient such that the fibers are "dense" in the inner periphery of the filter element 3 and very "porous" toward the outer periphery of the filter element 3 in a stepwise fashion as shown in FIG. 12. Still alternatively, the pump flow rate may be changed in a gradual (non-stepwise) fashion as shown by the chain-dot line C in FIG. 10. This allows the filter element 3 to have a density gradient such that the fibers are dense in the inner periphery of the filter element 3 and gradually become more porous toward the outer periphery of the filter element 3.

Where the filter element 3 has thick and thin circumferential (or radial) portions (for example, where the suction unit 13 shown in FIGS. 6 and 7 is used to form the filter element 3 shown in FIG. 8), the thick and thin portions may have respective density gradients. This can be done by changing the number and size (or area) of the suction openings 13a of the inner mold 133. Specifically, the number of the suction openings 13a per unit area is less in the thick portion than in the thin portion. The size of the suction openings 13a is greater in thick portion than in the thin portion. With this arrangement, the thick portion is lower in density than the thin portion (the thick portion has a low density (that is "porous"), whereas the thin portion has a high density (that is "dense". As a result, the filter element 3 as a whole is subject to uniform loss of pressure in the circumferential direction.

Upon completion of the molding, the molded body is removed from the suction unit 13 and then, the water tank 11. The molded body is then subject to dehydration. Thereafter, the molded article is heated at a predetermined temperature at a step (d) in FIG. 9, whereby the body is hardened. At this time, the binder fibers, as introduced together with the main fibers and micro fibers, are melted and cured to thereby maintain the shape of the filter element 3.

Following this step, binder resin (thermosetting resin such as phenol) is impregnated into the molded body at a step (e). The molded body is heated at a predetermined temperature at a step (f) to thereby cure the binder resin. This gives a required strength to the filter element 3.

Where it is necessary to said axially opposite ends of the filter element 3 (for example, opposite ends of the filter element 3 shown in FIG. 8 need be sealed to prevent the escape of oil directly from the axial grooves 3a formed in the inner periphery of the filter element 3), sealing elements (not shown) are adhesively attached to the opposite ends of the filter elements 3 by an adhesive agent (similar to the binder resin) at a step (g). This completes the filter element 3, for example, cylindrical element shown in FIG. 5 or star-shaped element shown in FIG. 8.

It is to be noted that in the step (d), the binder resin may be omitted provided that a combination of the main fibers and micro fibers is able to hold the shape of the filter element 3. Also, the binder resin may be omitted provided that the binder resin per se used at the step (a) is effective to give sufficient strength to the filter element 3. This modification eliminates the subsequent steps (e) and (f).

Figure 14:
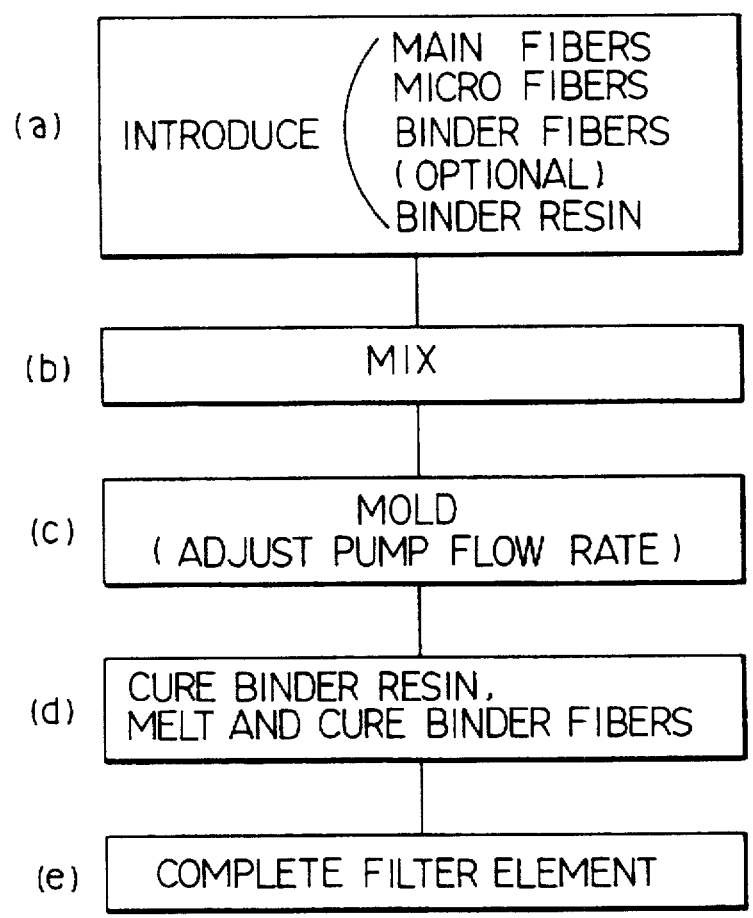
FIG. 14 is a flow chart showing a process by which a filter element is fabricated as a modification of the process of FIG. 9.

As shown in the flow chart of FIG. 14, the binder resin may be introduced together with the main fibers, micro fibers and binder fibers at the step (a) so as to maintain sufficient strength. In such a case, after the molded body is subject to dehydration, it is heated at a predetermined temperature to thereby melt and cure the binder fibers and to cure the thermosetting binder resin. This insures the strength of the filter element 3. The binder fiber may not necessarily be used since the binder resin is introduced at the beginning of fabrication.

Figure 15:
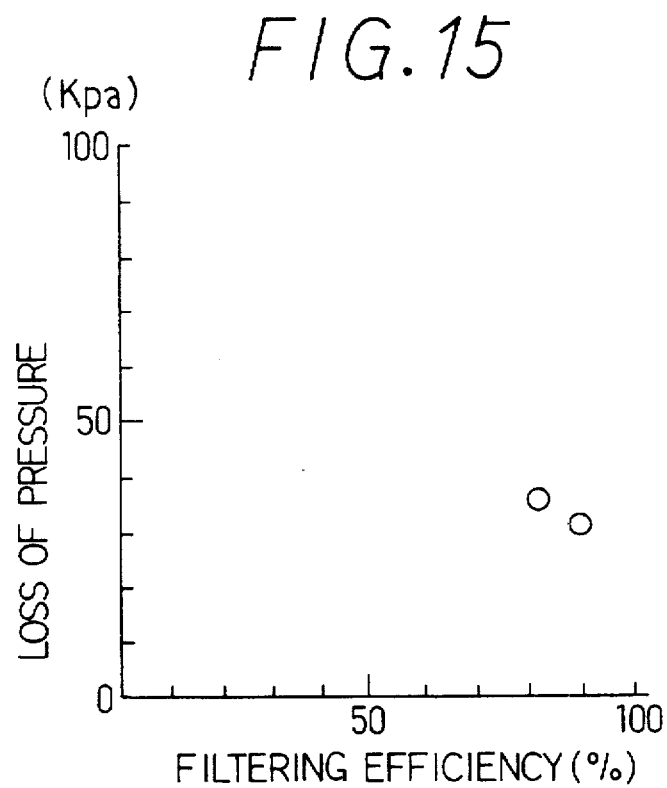
FIG. 15 is a graph showing loss of pressure and filtering efficiency of the filter element according to the first embodiment.

The filter element 3 thus fabricated is less subject to loss of pressure and is highly efficient in filtering operation. FIG. 15 shows the results of measurement on loss of pressure and filtering efficiency of the filter element 3 (star-shaped filter element shown in FIG. 8) which includes a combination of natural pulp as main fiber by 64 weight percent, fine acrylic fibers as micro fibers by 15 weight percent (filling density of 0.01 g/cm$^3$) and organic binder fibers of polyester system by 21 weight percent. This measurement shows that the filter element 3 of this embodiment suffers less from loss of pressure and provides high filtering efficiency.

Figure 16:
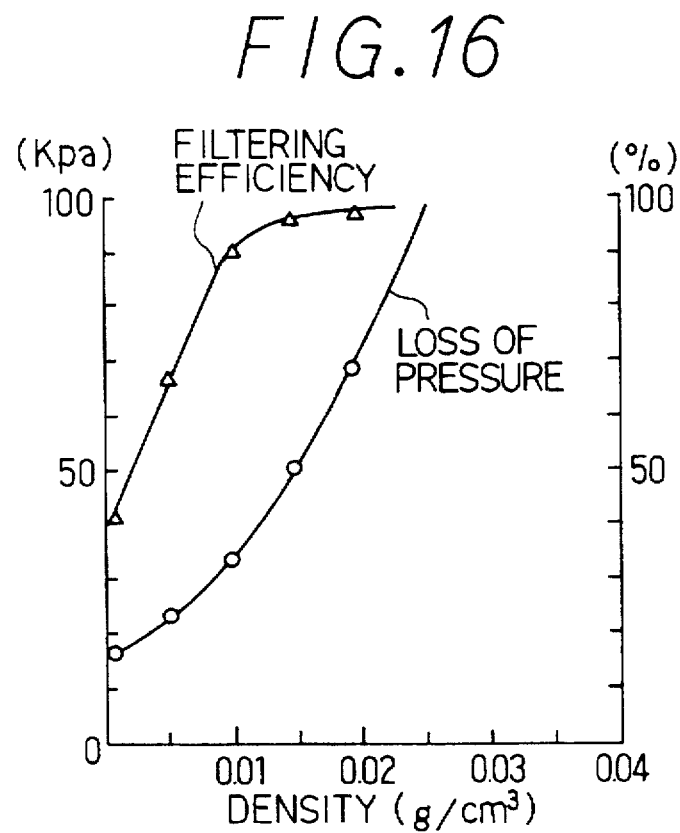
FIG. 16 is a graph showing the relationship between the density of the micro fibers and loss of pressure and filtering efficiency of the filter element according to the first embodiment.

FIG. 16 shows the relationship between the filling density of the micro fibers and the loss of pressure and filtering efficiency. This measurement shows that as the density of the micro fibers becomes higher, the filtering efficiency decreases, but the filter element is less subject to loss of pressure. To this end, the density of the micro fibers is preferably in the range from 0.005 to 0.02 g/cm$^3$. This range makes it possible to increase the filtering efficiency and reduce loss of pressure.

(Advantages of the First Embodiment)

According to this embodiment, the micro fibers have a density of 0.005 to 0.02 g/cm$^3$. This range enables the filter element 3 to be less subject to loss of pressure and provide high filtering efficiency, as shown in FIG. 16. The filter element 3 can thus be fabricated at a lower cost than a known paper filter (its micro fibers have a density of at least 0.04 g/cm$^3$) which requires the bending step to reduce loss of pressure. The filter element 3 shown in FIG. 8 where the plurality of grooves 3a, 3b are axially formed in the inner and outer peripheries of the filter element 3 has a larger area than the cylindrical filter element 3 shown in FIG. 5 and is thus less subject to loss of pressure.

Figure 17:
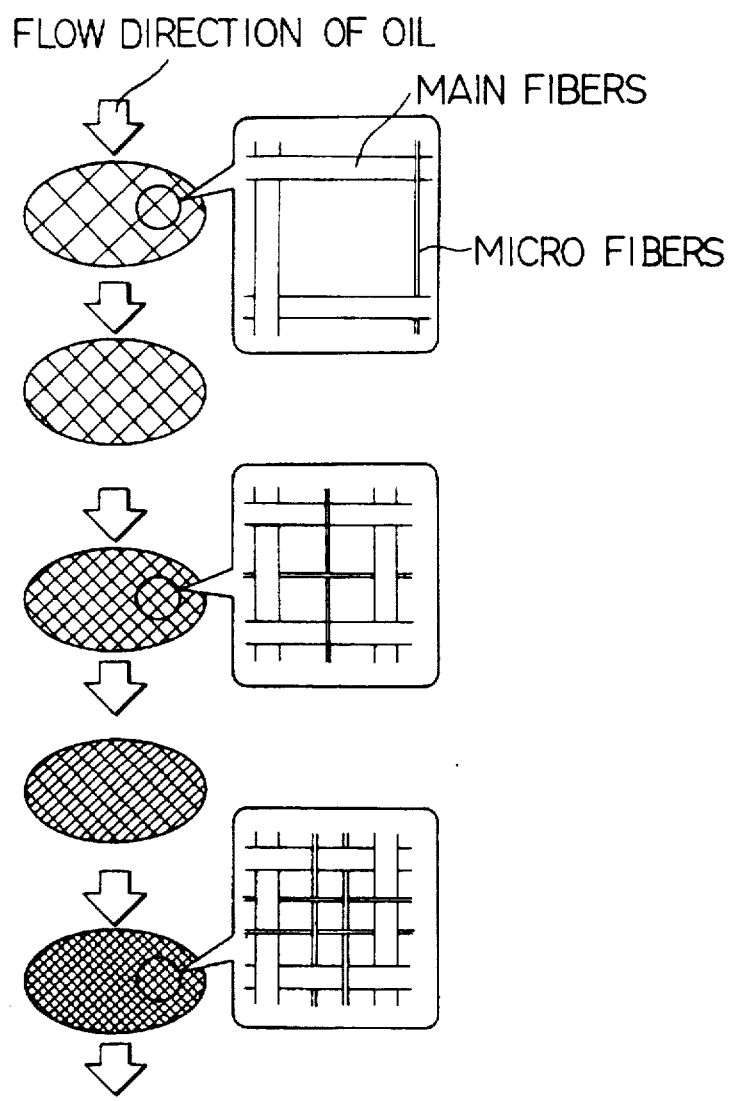
FIG. 17 is a view showing a process by which the density of the micro fibers is changed in a continuous manner as a modification of the first embodiment.

In the method of fabricating the filter element 3 according to this embodiment, the pump flow rate of the suction pump 14 is adjusted so as to readily give a density gradient to the radial (thickness) direction of the filter element 3. To obtain the same effect, the known paper filter requires a plurality of filter papers which differ in density from one another and are adhesively attached one above the other. The filter element of this embodiment eliminates the need to adhesively attach such papers and can thus be fabricated at a lower cost. Also, to give a filling density gradient, the pump flow rate of the suction pump 14 is changed continuously. This enables the micro fibers to be "porous" in the outer periphery (upper side) of the filter element 3 and gradually "denser" toward the inner periphery of the filter element 3 as shown in FIG. 17. This prevents a drastic change in the density or porosity of the micro fibers. As such, oil is less subject to turbulent flow while it passes through the filter element 3. No increase in the loss of pressure due to drastic change in the porosity of the micro fibers results.

To increase the filtering surface area, the filter element 3 has a plurality of grooves 3a, 3b in its inner and outer peripheral surfaces. The density of the micro fibers can be radially adjusted in the circumferential direction of the filter element 3 by changing the number or open area of the suction openings 13a of the inner mold 133. That is, the filter element 3 is subject to uniform loss of pressure in its circumferential direction when the density of the micro fibers is low in the circumferentially thick portion of the filter element 3 and high in the circumferentially thin portion of the filter element 3.

(Second Embodiment)

Figure 18:
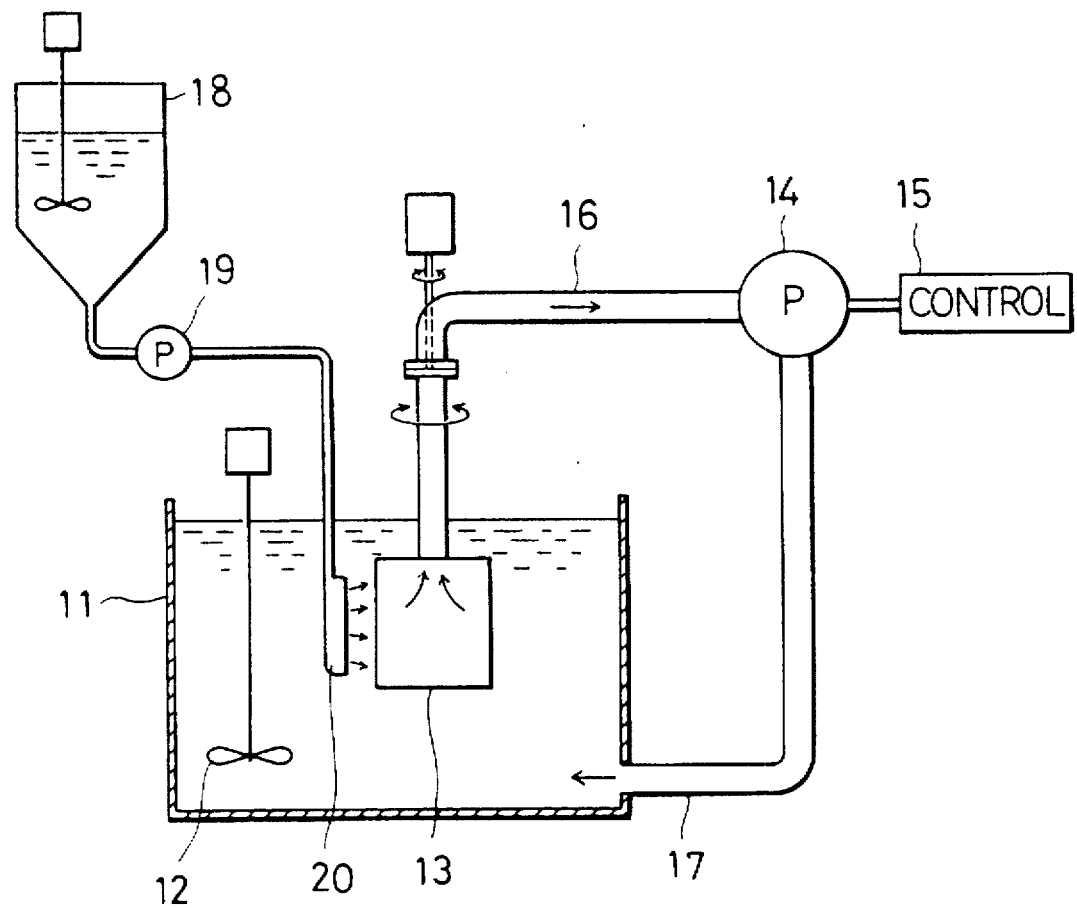
FIG. 18 is an overall view of a suction type mold system according to a second embodiment of the present invention.

In a second embodiment of the present invention shown in FIG. 18, a slurry includes micro fibers and is introduced into into the liquid where main fibers are already present. The suction type mold system generally includes the water tank 11 within which a slurry including a suspension of main fibers is contained, the mixer 12, the suction unit 13, the suction pump 14, the pump controller 15, a feed tank 18 within which a slurry including a suspension of micro fibers is contained, a feed pump 19 for forcing the slurry out of the feed tank 18, and a feed nozzle 20 for introducing the slurry from the feed pump 19 into the water tank 11. The slurry within the water tank 11 includes the main fibers and binder fibers (or binder resin) and does not include the micro fibers. The slurry within the feed tank 18 includes a suspension of the micro fibers (optionally, binder fibers and binder resin) and does not include the main fibers.

Figure 19:
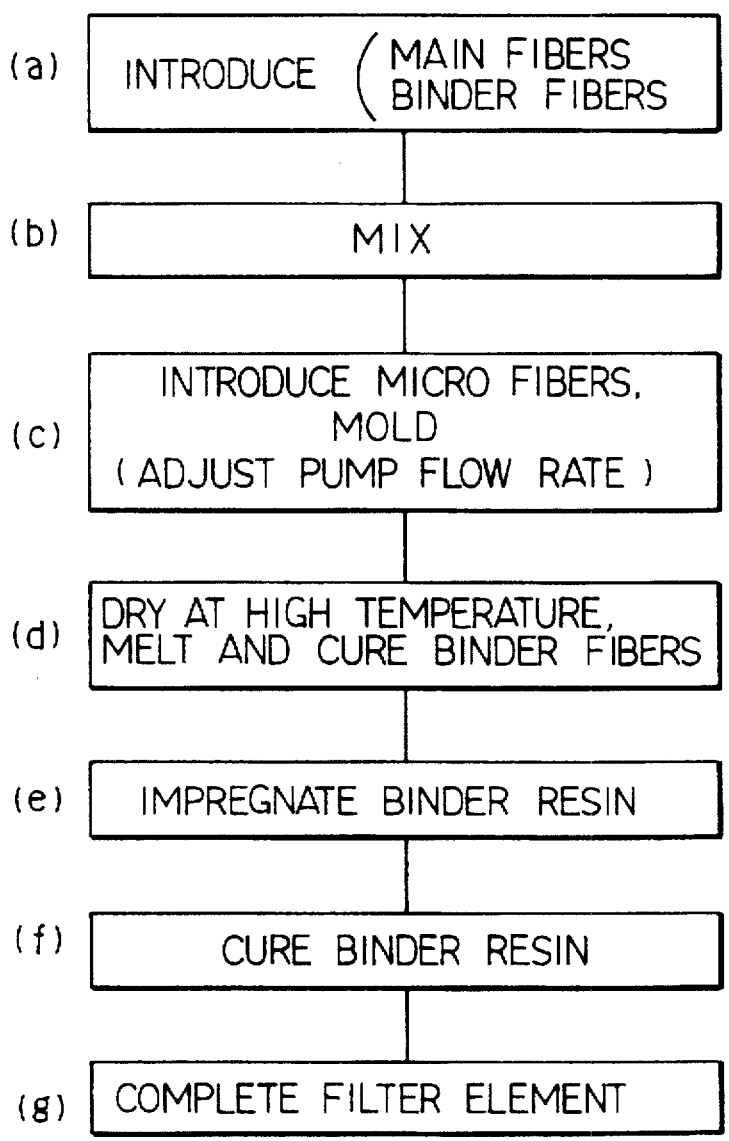
FIG. 19 is a flow chart showing a process by which a filter element is fabricated according to the second embodiment.

The filter element 3 by the use of this suction type mold system is fabricated by a sequence of fabrication steps shown in FIG. 19.

The main fibers are finely severed by a mixer (not shown) or other means. Thereafter, the main fibers are evenly mixed with the binder fibers. The mixture of main fibers and binder fivers is then introduced into the water tank 11 at a step (a). The mixer 12 is operated to mix and disperse the mixture at a step (b) such that the slurry has a uniform density.

Similarly, the micro fibers are finely severed and introduced into the feed tank 18. A mixer for the feed tank 18 is operated to mix and disperse the micro fibers such that the slurry has a uniform density.

Figure 20:
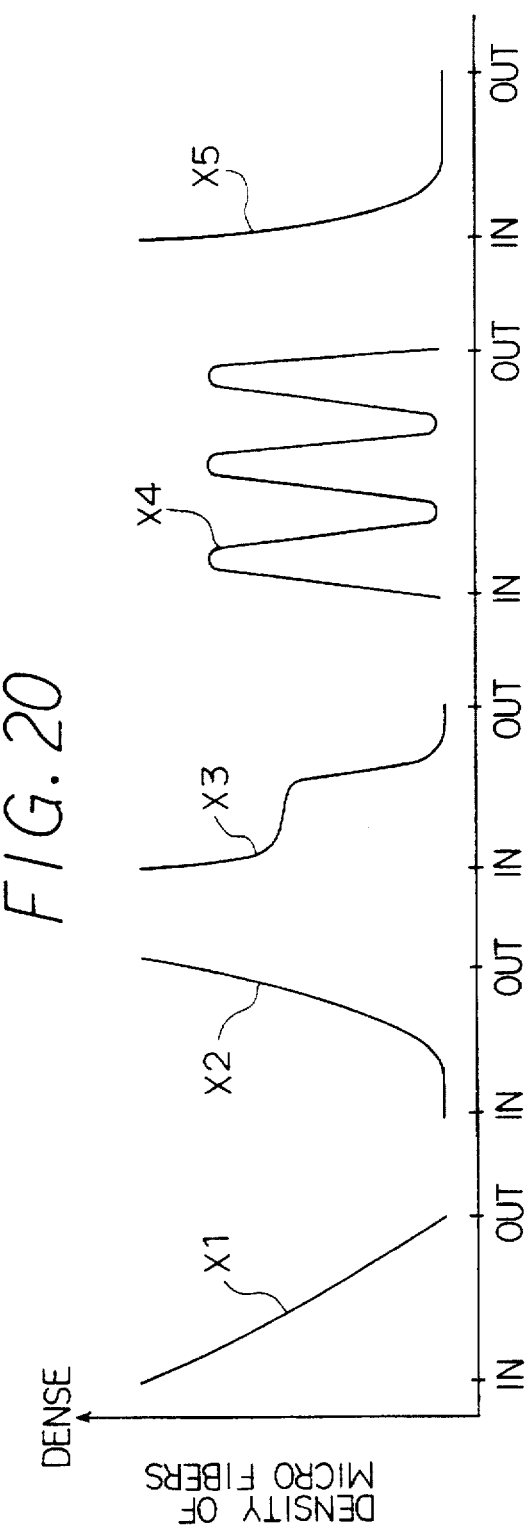
FIG. 20 is a graph showing patterns of change in the the density of micro fibers in the second embodiment.

Following this step, the suction pump 14 and the feed pump 19 are both operated to feed the slurry from the feed tank 18 into the water tank 11 and also, to draw the slurry (mixture of the main fibers and micro fibers) into the suction unit 13 through the suction openings 13a at a step (c). At this time, the speed of rotation of the suction pump 14 is adjusted under the control of the pump controller 15 as in the first embodiment to change the pump flow rate. This makes it possible to change the density of the micro fibers in the filter element 3. Specifically, the filter element 3 is given various density gradient patterns in its radial (thickness) direction as exemplified by curves X1 to X5 in FIG. 20, in which IN and OUT denote radially innermost and outermost portions of the filter element.

Where the suction unit 13 shown in FIGS. 6 and 7 is used to form the filter element 3 shown in FIG. 8 in this second embodiment, the thick and thin portions of the filter element may be given a density gradient by changing the number or size (open area) of the suction openings 13a of the inner mold 133, as in the first embodiment.

Figure 21:
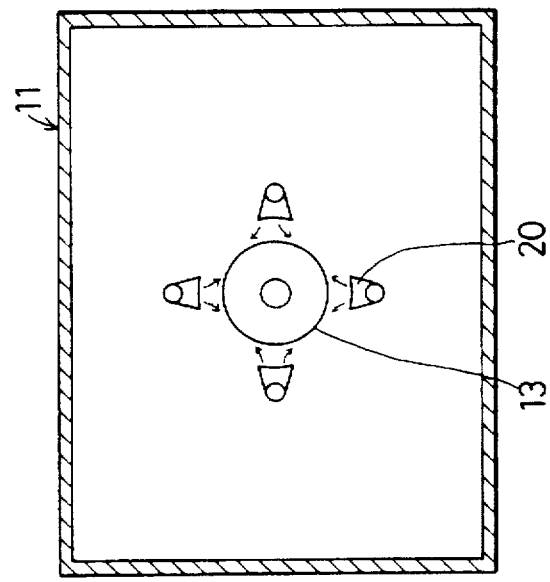
FIG. 21 is a plan view showing the positional relationship between the suction unit and a feed nozzles according to a modification of the second embodiment.

Also, by changing the circumferential positional relationship between the suction unit 13 and the feed nozzle 20 during the suction molding step, the micro fibers can be uniformly filled in the filter element 3. Specifically, (1) the feed nozzle 20 is fixed while the suction unit 13 is being rotated, or (2) the feed nozzle 20 is rotated (moved) around the suction unit 13 (which is, in turn, fixed in position). The suction molding step (b) may be carried out with a combination of (1) and (2). Alternatively, a plurality of feed nozzles 20 may be arranged around the suction unit 13 as shown in FIG. 21 in which is shown the positional relationship between the suction unit 13 and the feed nozzles 20.

After the suction molding step (c) is completed, the molded body is removed from the suction unit 13 and then, the water tank 11. The molded body is thereafter subjected to dehydration. The molded body is then heated at a predetermined temperature at a step (d) whereby it is dried and hardened. At this time, the binder fibers as introduced together with the main fibers and micro fibers are melted and cured so as to maintain the shape of the filter element 3.

Subsequently, binder resin is impregnated into the filter element at a step (e). Thereafter, the filter element 3 is heated at a predetermined temperature to cure the binder resin at a step (f). This gives a required degree of strength to the filter element 3.

Where it is necessary to seal axial opposite ends of the filter element 3, an adhesive agent is applied to the opposite ends of the filter element 3 to attach sealing elements thereto thus completing the filter element fabrication at a step (g), as in the first embodiment.

As in the first embodiment, the binder fibers may be omitted in the step (d) provided that a combination of the main fibers and micro fibers is effective to maintain the shape of the filter element 3. Also, where the binder fibers are introduced with the main fibers and the micro fibers, the binder resin may be omitted provided that the binder fibers per se are effective to hold the shape of the filter element 3. This eliminates the need for steps (e) and (f).

Figure 22:
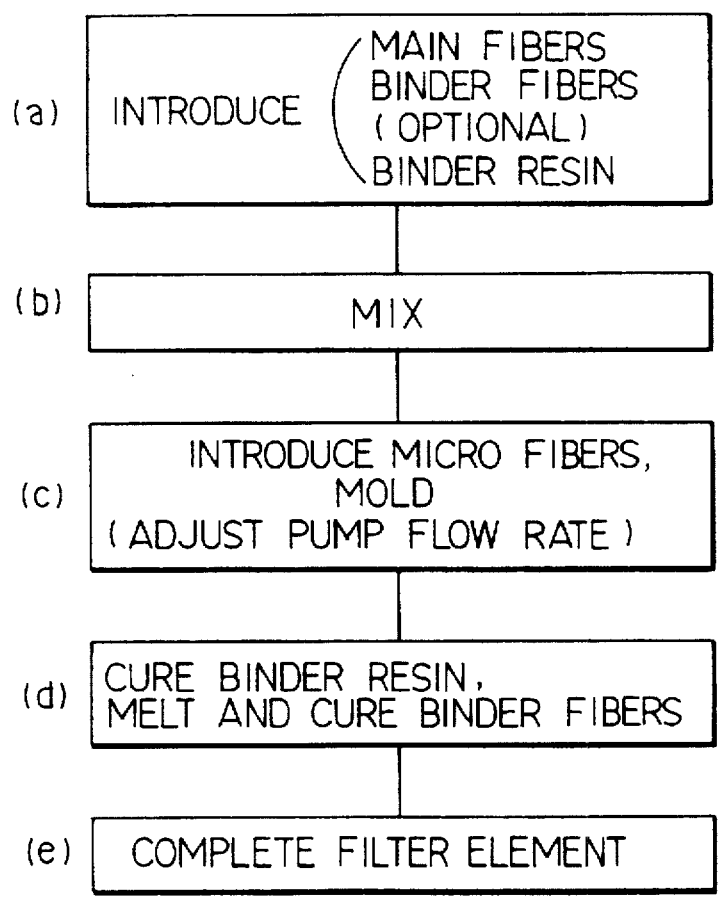
FIG. 22 is a flow chart showing a process by which a filter element is fabricated in the second embodiment.

As shown in the flow chart in FIG. 22, the binder resin may be introduced with the main fibers, micro fibers and binder fibers at the first step (a) in order to insure the strength of the filter element 3. In such a case, dehydration takes place after the suction molding step (c) is completed. The molded body is heated to thereby melt and cure the binder fibers at the step (d). Also, the binder resin is cured to insure the strength of the filter element 3. The binder fibers may be omitted since the binder resin is introduced at the beginning of fabrication.

(Advantages of Second Embodiment)

In addition to the advantages provided by the first embodiment, the second embodiment allows for ready change in the density of the micro fibers during the suction molding step. For example, the micro fibers can be dense in the inner periphery of the filter element 3 and can be porous in the outer periphery of the filter element 3 by increasing the amount of the micro fibers (slurry) fed from the feed nozzles 20 at the beginning of feed and decreasing the amount of the micro fibers (slurry) thereafter. This provides the same advantage that is provided where the filter element 3 is given a density gradient such that the micro fibers are "dense" in the inner periphery of the filter element 3 and are "porous" in the outer periphery of the filter element 3. Thus, clogging hardly occurs in the outer peripheral surface of the filter element 3 adjacent to its inlet side.

(Modifications)

Figure 23:
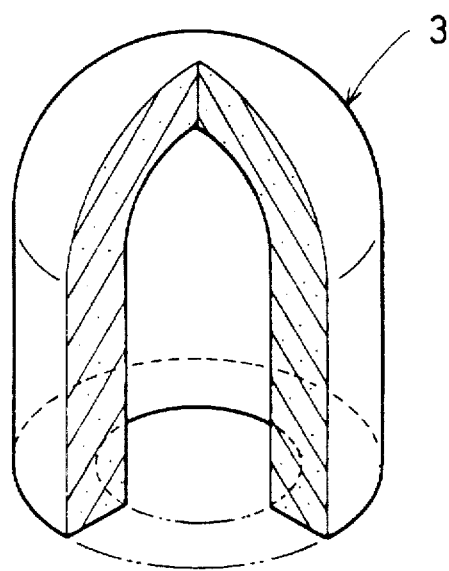
FIG. 23 is a perspective view, partly in section, of a modification of the filter element.
Figure 24:
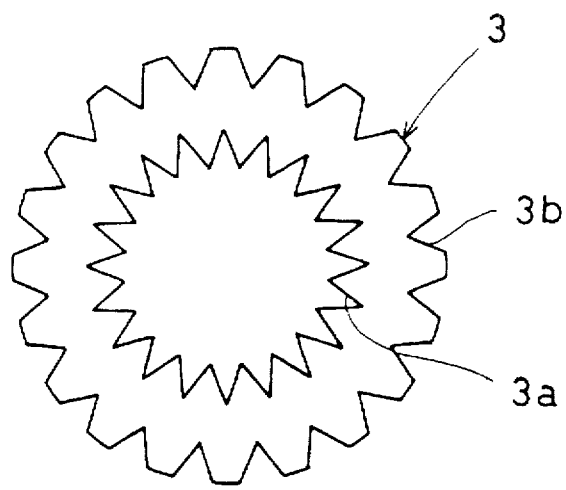
FIG. 24 is a plan view of a modification of the filter element.
Figure 25:
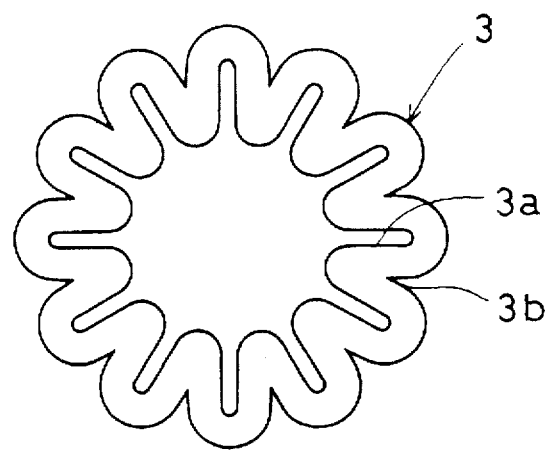
FIG. 25 is a plan view of a modification of the filter element.
Figure 26:
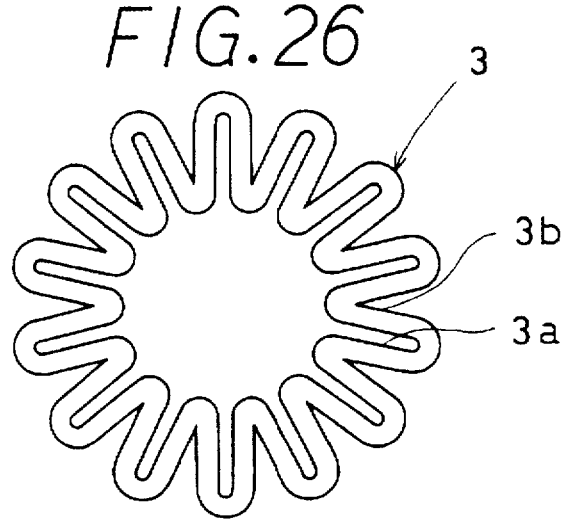
FIG. 26 is a plan view of a modification of the filter element.

The filter element 3 in the cylindrical shape (FIG. 5) may have one end open as shown in FIG. 23. When the suction unit 13 shown in FIGS. 6 and 7 is used to fabricate the filter element 3 with a plurality of axial grooves 3a, 3b in its inner and outer peripheries, the shape of the filter element 3 may be changed depending on the shape of the inner mold 133 and the outer mold 134, as shown in FIGS. 24 to 26. The filter element 3 shown in FIG. 8 includes the grooves 3a, 3b in both the inner and outer peripheries. The grooves 3a, 3b may alternatively be formed only in the inner periphery or the outer periphery of the filter element 3.

The filter element 3 may be given a density gradient in a manner other than those described in the first and second embodiments. For example, a plurality of water tanks 11 may be prepared to receive slurry of different filament densities. Suction molding takes place first by using the water tank 11 in which the slurry of high micro fiber density is contained and, then using the water tank in which the slurry of lower filament densities is contained. This also gives the filter element 3 a density gradient.

In the foregoing description, the filter element of the present invention is used as the filter element 3 for the oil filter 1. It will, of course, be understood that the filter element may also be used to filter liquid, gas or fluids other than oil.

(Third Embodiment)

Figure 27:
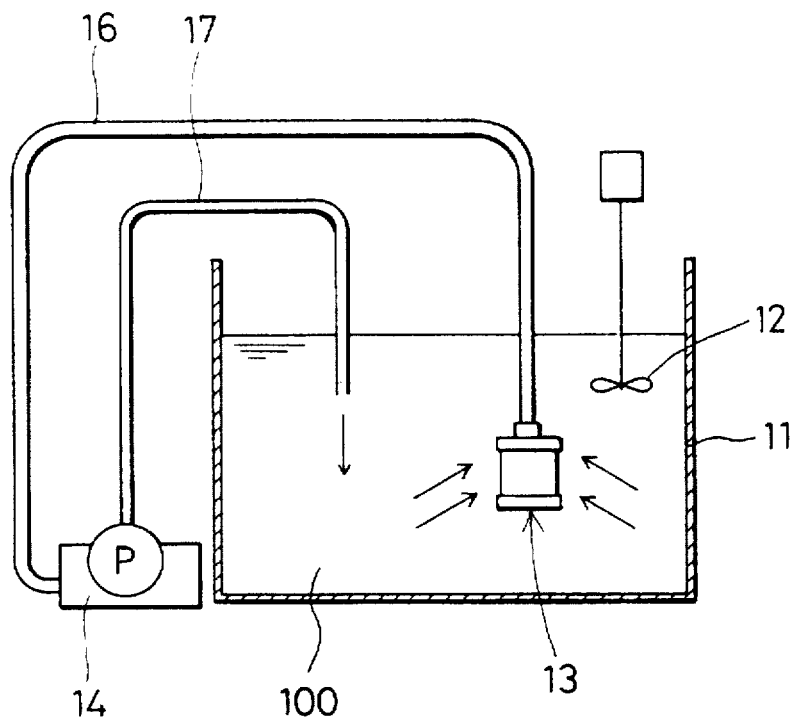
FIG. 27 is a perspective view of a mold system according to a third embodiment of the present invention.
Figure 28:
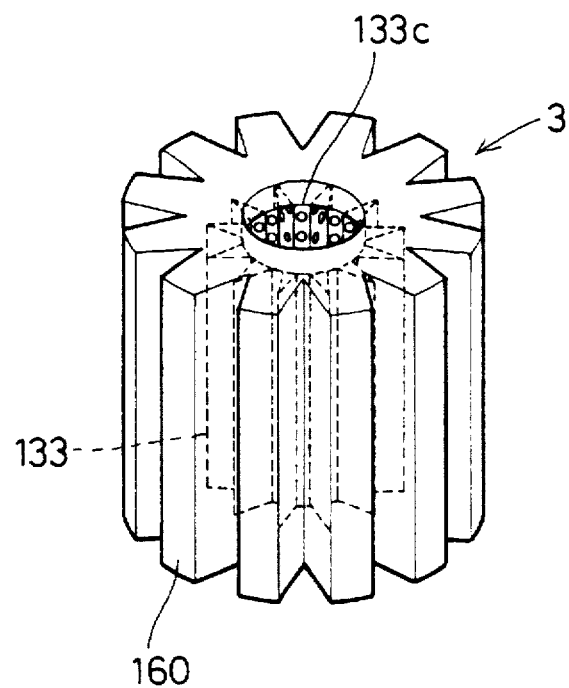
FIG. 28 is a perspective view of a filter element fabricated according to the third embodiment.

According to a third embodiment using a suction type mold system shown in FIG. 27, a filter element 3 shown in FIG. 28 is fabricated so that it may be incorporated, for example, into the oil filter of an internal combustion engine.

The suction type mold system includes, as in the first and the second embodiments, the water tank 11, the mixer 12 for agitating the slurry 100 within the water tank 11, the suction unit 13 adapted to draw the slurry 100 within the water tank 11 and form a molded body, and the suction pump 14 connected to the suction unit 13 through the suction pipe 16 and adapted to draw the slurry and return the slurry to the water tank 11 through the discharge pipe 17. The filter element 3 is made of fibers such as polyester, acryl and pulp. The polyester filter is effective to resist oil. The acryl filter is effective to improve filtering performance. The pulp filter is economical to fabricate.

Figure 29:
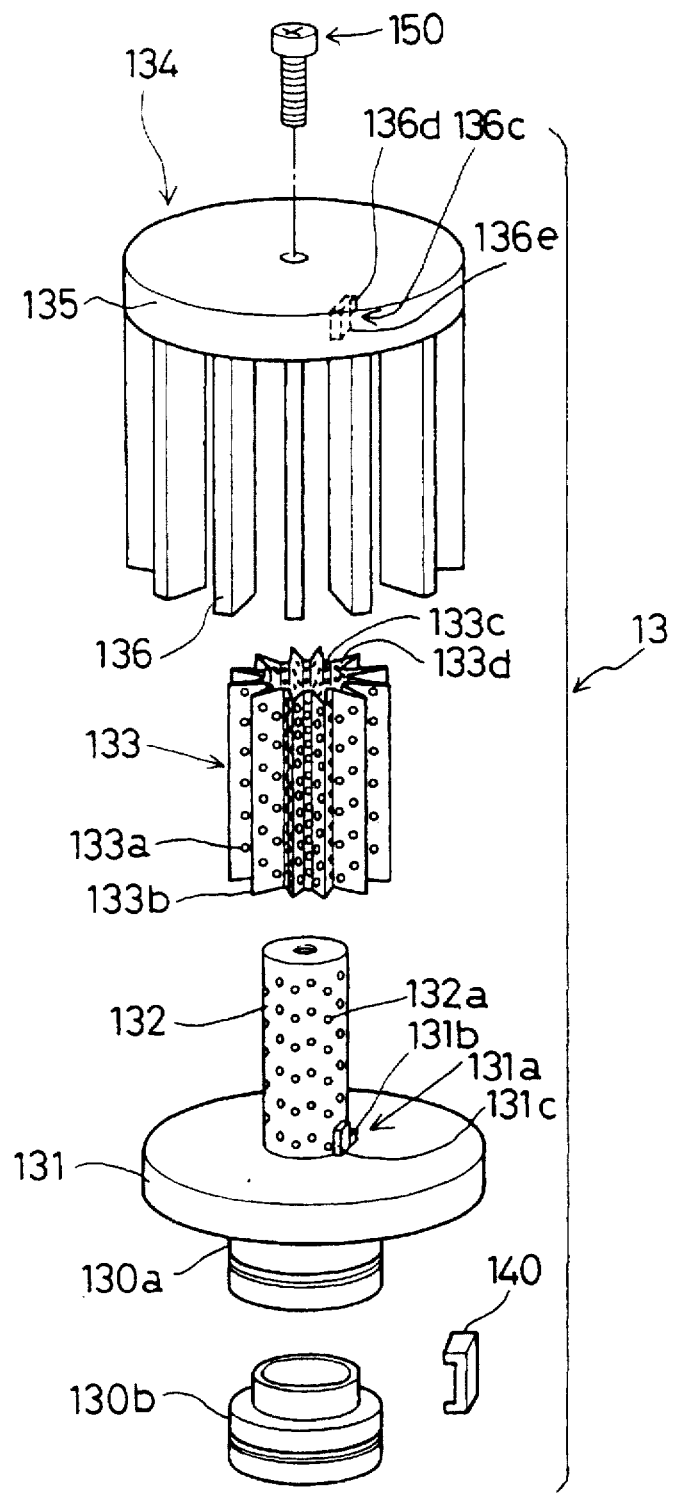
FIG. 29 is a schematic view of a suction unit used in the third embodiment.

As shown in FIG. 29, the suction unit 13 generally includes the circular base 131 having a connecting pipe 130a, the suction cylinder 132 attached to the base 131, the inner mold 133 mounted around the suction cylinder 132, and the outer mold 134.

The pipe 130a has an open end at the bottom. The suction pipe 16 is connected to the open end of the pipe 130a through a joint 130b. The joint 130b is fixed to the connecting pipe 130a by a stopper 140. The joint 130b allows relative rotation between the suction pipe 16 and the connecting pipe 130a.

The suction cylinder 132 includes a plurality of suction openings 132a arranged substantially uniformly over the entire surface of the suction cylinder 132. To increase the porosity of the suction cylinder 10, the number or size of the suction openings 132a may be greater in the top (upper end in FIG. 29) of the suction cylinder 132 than in the bottom (lower end in FIG. 29) of the suction cylinder 132.

The inner mold 133 has a given degree of rigidity in its axial and radial directions. A plurality of openings, apertures or slits are formed in the wall of the inner mold 133 to filter the slurry to allow fibers to pass therethrough. It is imperative that the openings are densely arranged such that a substantial loss of pressure may not occur.

The inner mold 133 is made of a stainless steel plate which is highly resistive to corrosion. The inner mold 133 has a multiplicity of circular holes or openings 133a. The inner mold 133 has a star-shaped section. The inner mold 133 has open ends and is machined to a cylindrical shape. The inner mold 33 defines the inner profile of the filter element 3 or the clean side of the oil filter and is substantially cylindrical in shape. A plurality of fins 133b extend radially outwardly from the inner mold 133. The inner mold 133 has a cylindrical center space 133c to receive the suction cylinder 132. The fins 133b define a plurality of triangular spaces 133d which extend radially from the center space 133c.

A substantially circular center opening is defined in either axial end of the inner mold 133. Also, a fin opening is defined in each of the fins 133b. It is imperative that in order to readily form the inner mold into a cylindrical shape, each fin opening has a size such that the fibers can be filtered out of the slurry. The fin opening may be smaller or even closed, but it is imperative that to close the center opening by contact with other members during subsequent fabrication steps, the fiber be stacked around the center opening. Also, the fibers should be stacked in each fin opening 133b. One of the open ends of the inner mold 133 may serve as the outlet of an oil filter. A relief valve may be mounted to the other open end of the inner mold 133.

A seat 131a is attached to the bottom end of the suction cylinder 132 adjacent to the base 131. The lower end of the inner mold 133 rests on the seat 131a to provide a clearance between the lower end of the inner mold 133 and the base 131. The seat 131a also locks the inner mold 133 against rotation. The seat 131a includes a spacer 131b on which the inner mold 133 is seated, and a stopper 131c adapted to engage the fins 133b of the inner mold 133 to prevent rotation of the inner mold 133. The seat 131a defines the clearance between the inner mold 133 and the base 131 and allows the fibers to be stacked in the lower end of the inner mold 133 during a drawing step which will later be described. The fin openings formed in the lower end of the inner mold 133 are closed by the fibers. One side of the base 131 adjacent to the inner mold 133 defines the outer profile of the fibers to be stacked within the clearance and forms a part of the outer mold.

The outer mold 134 defines the outer profile of the filter element 3 or the dirty side of the oil filter. A seat 136c is attached to one side of a circular base 135 adjacent to the inner mold 133 and corresponds to the seat 131a of the base 131. Similarly, this seat 136c includes a spacer 136d and a stopper 136e. The circular base 135 has a smooth surface adjacent to the inner mold 133 and defines the outer profile of fibers to be stacked in the clearance between the circular base 135 and the inner mold 133. The circular base 135 thus defines the end profile of the filter element 3.

A plurality of pawls 136 have a generally triangular section. These pawls 136 extend within adjacent grooves which are in turn formed between adjacent fins 133b. The pawls 136 are spaced from the inner mold 133 and define the outer profile of fibers to be stacked in the space between the pawls 136 and the inner mold 133. The pawls 136 are spaced from one another to allow the passage of fibers therebetween. This arrangement allows the slurry to flow from substantially the entire outer periphery of the pawls 136 toward the inner mold 133 so that the fibers are oriented in a uniform fashion. This also makes it possible to carry out the drawing step within a short period of time.

The suction cylinder 132 has a closed top and includes a threaded hole to receive a set screw 150. This screw 150 secures the inner mold 133 and the outer mold 134 to the base 131 so as to complete assembly of the suction unit 13.

Figure 30:
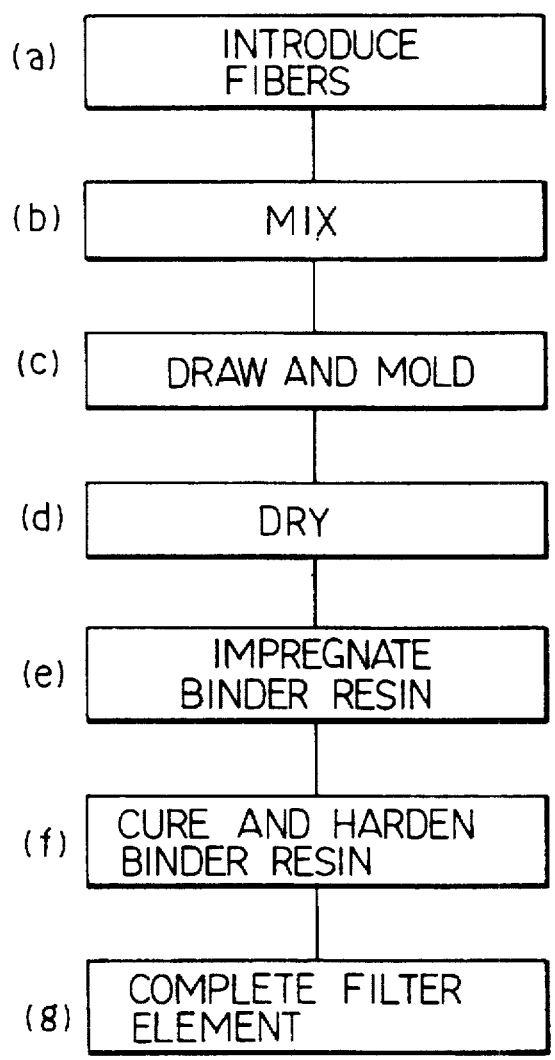
FIG. 30 is a flow chart showing a process of fabricating a filter element in the third embodiment.

Fabrication of the filter element 3 is performed by a process shown in FIG. 30.

Firstly, fibers are finely severed by a mixer (not shown). The fibers are uniformly mixed with binder fibers (or heat sealable fibers). The mixture is then introduced into the water tank 11 at a step (a). The mixture is mixed and dispersed in the water tank 11 by the mixer 12 at a step(b) so that the fibers have a uniform filling density.

Figure 31:
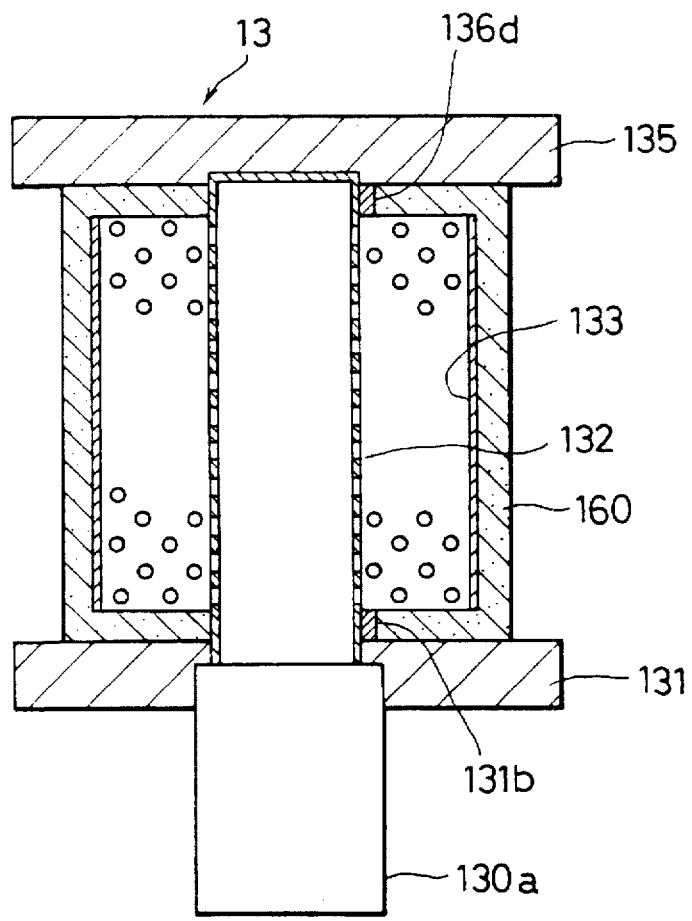
FIG. 31 is a schematic section of the suction unit and molded body after molding is completed in the third embodiment.

Following this step, the suction unit 13 is immersed in the slurry 100. The suction pump 14 is then driven to draw the fibers at a step (c). During this drawing, the pump flow rate of the suction pump 14 is adjusted while the suction unit 13 is being rotated. The slurry 100 enters the suction unit 13, flows through the suction pipe 16, the suction pump 14 and the discharge pipe 17, and is then returned to the water tank 11. When the slurry 100 passes through the suction openings 133a of the inner mold 133, some of the fibers within the slurry 100 are attached to the surface of the inner mold 133 without passing therethrough. The fibers thus attached are subsequently stacked to form a layer. This layer is formed between the inner mold 133 and the outer mold 134 and provides a molded body 160 (FIGS. 28 and 31). The molded body 160 is cylindrical in shape and has a star-shaped section as shown in FIG. 28. FIG. 31 shows a section of the suction unit 13 and the molded body 160 after the drawing and molding step is completed, with the pawls 136 being omitted. The molded body 160 extends around the inner mold 133 and also, over the ends of the inner mold 133.

After the drawing and molding process is completed, the molded body 160 together with the inner mold 133 is removed from the suction unit 13. After the molded body 160 is taken out of the water tank 11, it is subjected to dehydration. The molded body 160 is then heated at a predetermined temperature at a step (d) whereby the molded body is hardened.

Subsequently thereafter, binder fibers such as thermosetting resins, e.g., phenol, are impregnated into the molded body 160 at a step (e). The molded body 160 is then heated at a predetermined temperature at a step (f) to thereby cure the binder resin. After these steps, a filter element 3 is completed at a step (g).

The filter element 3 is composed of the molded body 160 and the core or inner mold 133 located within the molded body 160 as shown in FIG. 28.

The filter element thus fabricated is substantially cylindrical in shape. As shown in FIG. 28, the filter element 3 is formed on its outer periphery with a plurality of axial fins which extend in the direction in which the suction unit is separated. The filter element 3 has at its opposite ends a pair of central openings through which the suction cylinder 132 has extended during the fabrication. The filter element 3 defines an inner space which has a star-shaped section and corresponds in shape to the inner mold 133.

The filter element 3 thus fabricated is incorporated into the oil filter of the internal combustion engine to filter a lubricant. The filter element 3 is contained in the housing of the oil filter. One of the center openings serves as an outlet and is connected to the housing. The other center opening of the filter element is closed by a relief valve.

(Advantages of Third Embodiment)

In this embodiment, the inner mold 133 serves as the core of the filter element 3. The molded body 160 together with the inner mold 133 is removed from the suction unit 13 while the inner mold 133 is being held. Thus, the molded body 160, even if it is in a sherbet or cotton-like state, can readily be removed from the suction unit 13 after the drawing and molding step is completed. In any of the subsequent steps, the molded body can readily be positioned since the inner mold serves as a positional reference. This leads to a substantial increase in productivity and allows for mass production.

As the inner mold 133 is used as the core of the filter element 3, it is no longer necessary to remove the inner mold 133 from the molded body 160 after the drawing and molding step is completed. The molded body can be molded into a complicated shape corresponding to that of the inner mold 133.

Advantageously, the filter element 3 can be strengthened by increasing the strength of the core or inner mold 133 per se.

Additionally, in this embodiment, the molded body 160 defines the center opening through which a fluid to be filtered flows out of the filter element 3. Although the inner mold 133 of a star-shaped section is used, the molded body 160 provides a smooth circular seal surface. A simple seal is thus usable to seal the space against a housing or other elements where the filter element 3 is fitted for use as an oil filter. Also, the molded body 160 defines another center opening to mount a relief valve. This makes it possible to adhesively attach a separate, disk-shaped relief valve directly to the surface of the molded body 160.

(Modifications)

In the foregoing embodiment, the suction cylinder 132 is disposed within the inner mold 133. The suction cylinder 132 may be omitted where the inner mold 133 is designed to directly draw the slurry 100.

Although the slurry 100 is returned to the water tank 11 after it has been drawn by the suction pump 14. The slurry 100 may be drawn from the water tank 11 to form the molded body 160 without being returned to the water tank 11.

Further, the inner mold 133 is made of a punched metal. It may alternatively be in the form of a net or may have slits. Still alternatively, the inner mold 133 may be made of a porous material (such as sponge or sintered body. It may not necessarily be made of metal and may be made of resin.

The cylindrical inner mold 133 has open ends. Alternatively, one of the center openings at the axial ends of the inner mold 133 may be closed by a cap, and a relief valve as one of the essential features of an oil filter may be mounted to the other open end of the inner mold 133.

Also, the inner mold 133 is fixed with a space left between the base 131 and the outer mold 134 so as to stack fibers on opposite ends of the inner mold 133. However, the fibers may be stacked on only one end of the inner mold 133. Still alternatively, the both axial ends of the inner mold 133 may be in contact with the bases 131 and 135. In such a case, openings may be formed at both ends of the filter element 3 corresponding in shape to the inner mold 133. Those openings can be closed by separate closure members. For example, a sheet of annular filter paper is adhesively attached to either end of the filter element 3 with the center openings left unclosed.

In the foregoing embodiment, the drying step (d) and the binder resin curing step (f) are carried out separately. The independent drying step may be omitted and drying may be carried out during the binder resin curing step (f). In such a case, the slurry and the binder resin should preferably utilize a common solvent.

Also, although the binder resin impregnating step (e) is carried out after the drawing and molding step (c) necessitating two wet processes, drying and curing of the resin may be carried out at the same time after the binder resin is introduced into the slurry 100 in step (a). This eliminates the need for steps (e) and (f).

Figure 32:
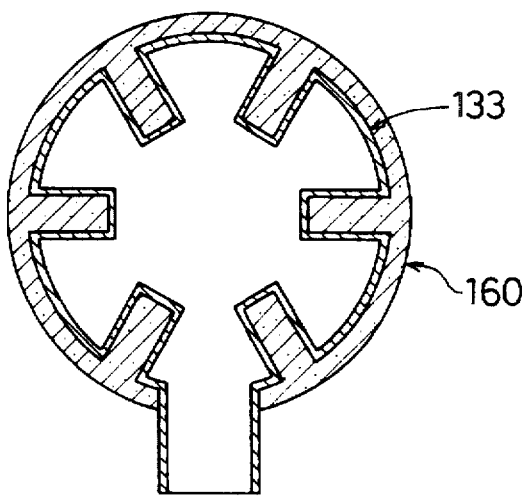
FIG. 32 is a vertical sectional view of an inner mold with a molded body as a modification of the third embodiment.

As shown in FIG. 32, the inner mold 133 may be generally in the form of a sphere ball on which a molded body 160 is formed. In such a case, the spherical inner mold 110 has a plurality of inwardly extending recesses in order to increase its surface area.

Figure 33:
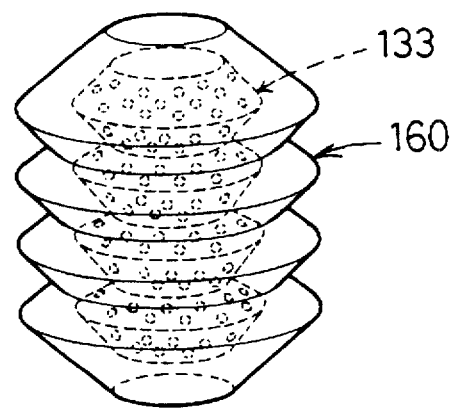
FIG. 33 is a perspective view showing an inner mold with a molded body as a modification of the third embodiment.

As shown in FIG. 33, there may be employed an inner mold 133 in the form of bellows. In such a case, the outer mold should preferably be separated in a direction at right angles to the axis of the inner mold 133. The molded body 160 is made by the use of this inner mold 133.

Figure 34:
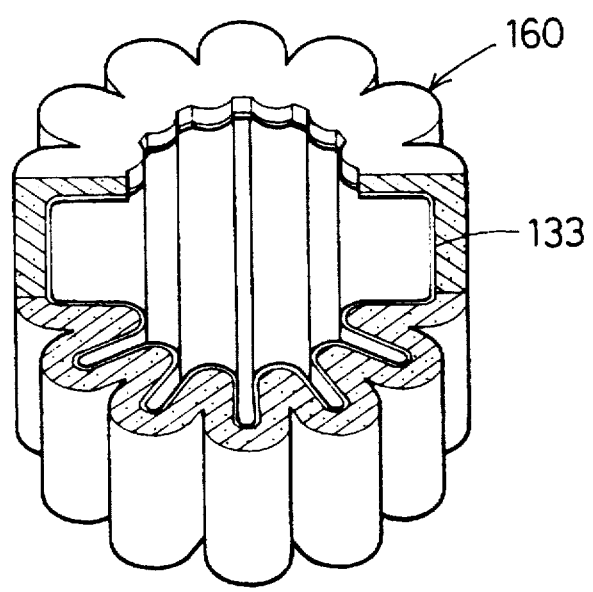
FIG. 34 is a perspective view, partly in section, of a molded body as a modification of the third embodiment.

As shown in FIG. 34, there may also be employed a daisy or petal-shaped inner mold 133. In such a case, the outer mold should preferably correspond in shape to the inner mold 133. A molded body 160 is molded into a daisy shape.

(Fourth Embodiment)

Figure 35:
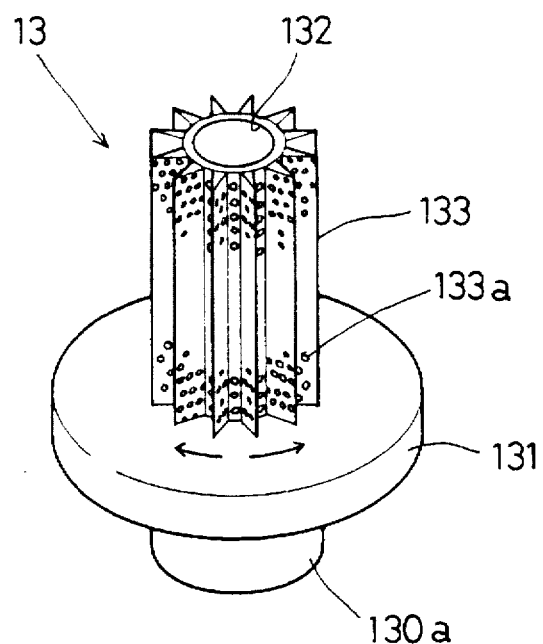
FIG. 35 is a perspective view of a suction unit used in a fourth embodiment of the present invention.

In this embodiment, as shown in FIG. 35, the drawing position is made changeable during a drawing step. The suction cylinder 132 of the suction unit 13 is rotated by a given angle, relative to the inner mold 133 and the outer mold 134. A plurality of suction openings are arranged in the suction cylinder 132 in correspondence to the rotation angle.

Figure 36:
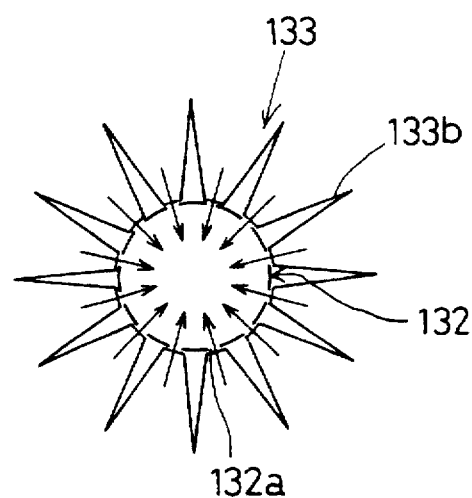
FIG. 36 is a schematic view showing the position of the inner mold according to the fourth embodiment.
Figure 37:
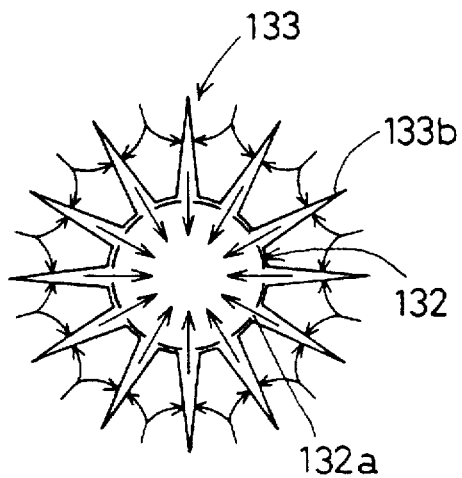
FIG. 37 is a schematic view showing the position of the inner mold during drawing in the fourth embodiment.

During the drawing step, the pump flow rate of the suction pump 14 is adjusted while the suction unit 13 is being rotated. At this time, the angular position of the inner mold 133 is changed. More specifically, as shown in FIG. 36, the inner mold 133 includes a plurality of recesses (located between adjacent fins 133b, 133b). The suction openings 132a of the suction cylinder 132 are brought into alignment with these recesses to effect drawing. Thereafter, the suction cylinder 132 is rotated relative to the inner mold 133 by a given angle. As shown in FIG. 37, the ridges of the inner mold 133 are brought into alignment with the suction openings 132a of the suction cylinder 132. This not only allows fibers to be stacked substantially uniformly and deeply into the small grooves (or recesses of the inner mold 133) between the inner mold 133 and the outer mold 134, but also allows the fibers to extend in a direction substantially normal to the direction in which a fluid (oil) to be filtered flows. This insures filtering performance in a constant manner.

Figure 38:
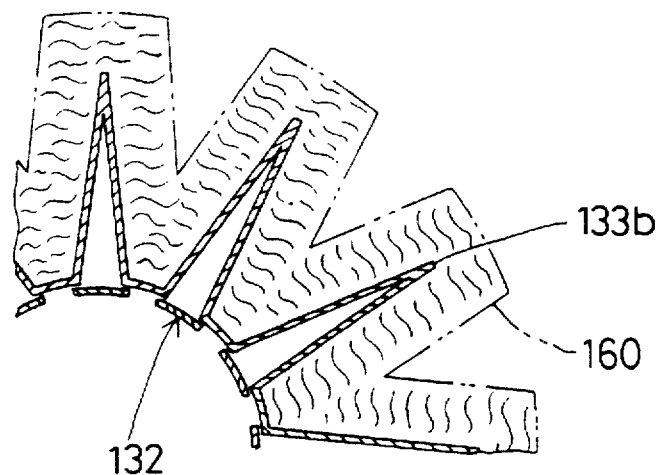
FIG. 38 is a schematic section showing the orientation of fibers in the molded body fabricated in the fourth embodiment.
Figure 39:
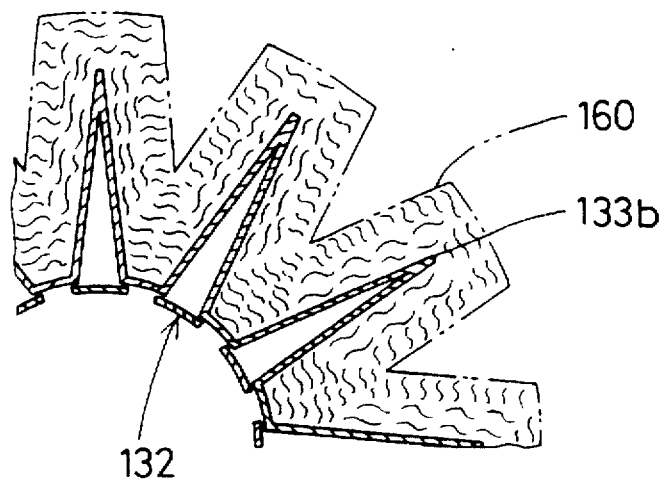
FIG. 39 is a schematic section showing the orientation of fibers in the molded body fabricated in the fourth embodiment.

The direction of drawing is subject to change depending upon the shape of the inner mold 133. This allows the fibers shown in FIG. 38 to be stacked in a manner as shown in FIG. 39. The fibers extend parallel to the surface of the inner mold 133. A unifrom level of filtering performance can thus be obtained over the entire inner mold 133.

This approach may be applied to the molded body 160 having altenate convex and concave portions in the axial direction as shown in FIG. 33. The molded body 160 is rugged in its vertical direction (or axial direction of the inner mold 133). Specifically, the suction cylinder 132 is slid in the vertical or axial direction to change the vertical position of the inner mold 133 during the drawing step. This offers the same effect as above.

(Fifth Embodiment)

Figure 40:
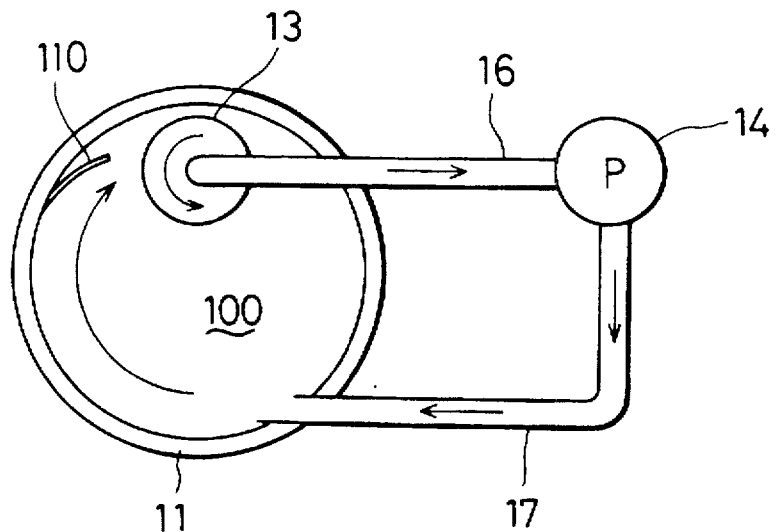
FIG. 40 is a schematic plan view of a suction type molding system according to a fifth embodiment of the present invention.
Figure 41:
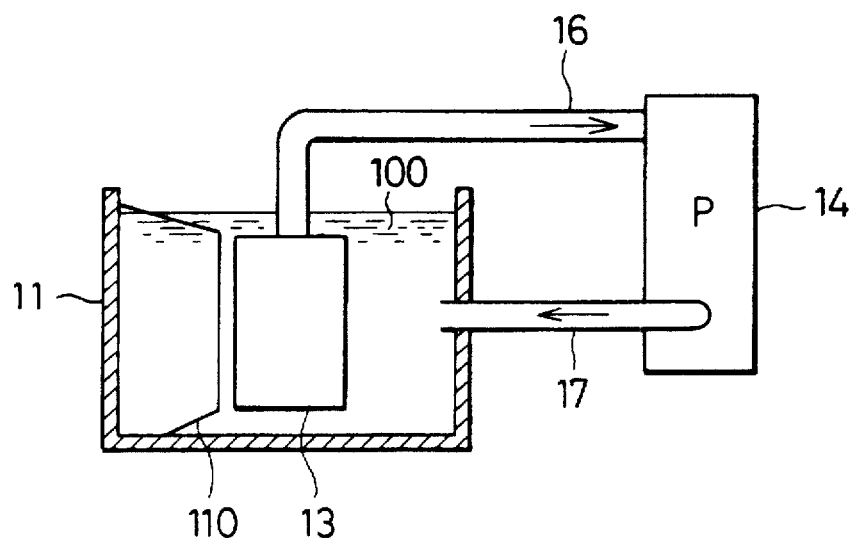
FIG. 41 is a side sectional view of the suction type molding system shown in FIG. 40.

In the fifth embodiment shown in FIGS. 40 and 41, the slurry 100 is regularly circulated within the tank 11 during the drawing and molding step. More specifically, the suction type molding system generally includes the tank 11 within which the slurry 100 is contained, the suction unit 13 for drawing the slurry 100, and the suction pump 14 connected to the suction unit 13 through the suction pipe 16 to draw the slurry 100 and adapted to return the slurry to the tank 11 through the discharge pipe 17. The discharge pipe 17 is attached to the side wall of the tank 11 at a small angle so as to allow the slurry 100 to flow along the inner wall of the tank 11 after it has been introduced into the tank 11 from the discharge pipe 17. As shown in FIG. 40, the suction unit 13 connected to the suction pipe 16 is disposed in a circulating (or spiral) flow within the tank 11. The suction unit 13 is rotated relative to the suction pipe 16 by a motor or other drive means (not shown) during the drawing and molding step. An arcuate guide vane 110 is disposed in the tank 11 for directing the slurry toward the suction unit 13.

In this embodiment, a spiral flow is created in the tank 11 to adjust the flow of the slurry 100. The suction unit 13 is disposed within the flow of the slurry 100. This arrangement allows the fibers to be uniformly scattered in the slurry 100 and positively feeds the slurry 100 to the suction unit 13. This system is more advantageous than the system wherein the slurry 100 within the tank 11 is agitated by a mixer or similar means, and can fabricate the molded body in a faster and uniform manner.

The tank 11 may take any shape (for example, may be ellipsoidal) as far as the slurry can be circulated in a regular fashion. Although the spiral flow is created by the output flow of the suction pump 14, the suction pump may be replaced by any other type of pump which produces the spiral flow.

The present invention described above should not be limited to the foregoing embodiments and modifications, but may be modified further without departing from the spirit and scope of the invention.

What is claimed is:

1. A filter element comprising:

a cylindrical portion having at least one closed end and being molded of a slurry of main fibers and micro fibers;

said main fibers having a fiber diameter of at least 5 μm;

said micro fibers having a fiber diameter of less than 5 μm; and said micro fibers being filled 0.005 to 0.02 g/cm$^3$ in said cylindrical portion.

2. A filter element as in claim 1 wherein:

said cylindrical portion has a fiber density gradient such that the fibers are more porous at an inlet side and denser at an outlet side in the direction of fluid flow to be filtered.

3. A filter element as in claim 2, wherein:

a plurality of axial grooves are formed in at least one of an outer surface and an inner surface of said cylindrical portion.

4. A filter element comprising:

a cylindrical portion having at least one closed end and being molded of a slurry of main fibers and micro fibers;

said main fibers having a fiber diameter of at least 5 μm;

said micro fibers having a fiber diameter of less than 5 μm; and a plurality of axial grooves being formed in at least one of an outer surface and an inner surface of said cylindrical portion, whereby said cylindrical portion has circumferentially thin and thick portions; and said cylindrical portion has a fiber density gradient in its circumferential direction such that said thick portion has a low density and said thin portion has a high density.

5. A method of fabricating a filter element which includes a cylindrical portion having at least one closed end and molded of a slurry of main fibers and micro fibers, said main fibers having a fiber diameter of at least 5 μm and said micro fibers having a fiber diameter of less than 5 μm, said method, comprising the steps of:

feeding in a liquid tank said slurry including said main fibers and said micro fibers; and drawing said slurry into a suction unit immersed in said slurry; and wherein said drawing step draws said slurry through a plurality of suction openings formed on said suction unit, density of said openings being changed in a circumferential direction of said suction unit.

6. A method as in claim 5 wherein:

said drawing step includes the step of changing a flow rate of a suction pump connected to said suction unit for slurry drawing.

7. A method of fabricating a filter element which includes a cylindrical portion having at least one closed end and molded of a slurry of main fibers and micro fibers, said main fibers having a fiber diameter of at least 5 μm and said micro fibers having a fiber diameter of less than 5 μm, said method, comprising the steps of:

storing a first slurry including said main fibers in a tank;

feeding into said tank a second slurry including said micro fibers;

drawing a mixture of said first slurry and said second slurry into a suction unit immersed within said tank; and wherein said feeding step uses a plurality of feed nozzles arranged around said suction unit to feed said second slurry into said tank, said suction unit and said feed nozzles being changed in circumferential positional relation therebetween during said feeding step and said drawing step.

8. A method of fabricating a filter element comprising the steps of:

drawing a slurry through an inner mold of a suction unit immersed in a tank to stack fibers suspended within said slurry on a surface of said inner mold to form a molded body, said inner mold having a predetermined opening ratio;

using said inner mold as a reference to hold and position said molded body during subsequent fabrication steps;

said inner mold being cylindrical in shape and having open ends at both axial sides; and wherein said inner mold is formed on its outer periphery with a plurality of axial fins, and said fins define a space at said axial sides of said inner mold, said space being closed by said fibers.

9. A method as in claim 8 wherein:

said inner mold is formed on its outer periphery with recesses and ridges, a slurry drawing position of said inner mold being changed from said recesses to said ridges during said drawing step.

10. A method of fabricating a filter element comprising the steps of:

drawing a slurry through an inner mold of a suction unit immersed in a tank to stack fibers suspended within said slurry on a surface of said inner mold to form a molded body, said inner mold having a predetermined opening ratio;

using said inner mold as a reference to hold and position said molded body during subsequent fabrication steps;

wherein said inner mold is formed on its outer periphery with recesses and ridges, a slurry drawing position of said inner mold being changed from said recesses to said ridges during said drawing step;

wherein said suction unit includes a suction cylinder disposed inside said inner mold and having a plurality of suction openings; and wherein a relative position between said inner mold and said suction cylinder is changed so as to change a relative position of said openings to said inner mold during said drawing step.

11. A method as in claim 10 further comprising the step of:

generating a circulating flow in said tank regularly during said drawing step.

12. A method as in claim 10 further comprising:

rotating said inner mold during said drawing step.

13. A method of fabricating a filter element comprising the steps of:

drawing a slurry through an inner mold of a suction unit immersed in a tank to stack fibers suspended within said slurry on a surface of said inner mold to form a molded body, said inner mold having a predetermined opening ratio;

using said inner mold as a reference to hold and position said molded body during subsequent fabrication steps;

wherein said suction unit includes a suction cylinder received inside said inner mold and formed with a plurality of suction openings, said suction openings being substantially uniformly arranged over an entire cylinder surface; and wherein an opening rate of said suction cylinder is lower than that of said inner mold.

14. A filter element comprising:

an inner mold used to draw a slurry of fibers therethrough and to stack said fibers thereon;

a molded body formed by said stacked fibers, said molded body being kept integrally with said inner mold;

said inner mold being cylindrical in shape and has open ends at both axial sides;

said inner mold being formed on its outer periphery with a plurality of axial fins defining a space at said axial sides of said inner mold; and said space being closed by said molded body.

* * * * *